(12) United States Patent
Cariou et al.

(10) Patent No.: US 8,913,676 B2
(45) Date of Patent: Dec. 16, 2014

(54) METHODS OF TRANSMITTING AND RECEIVING A MULTICARRIER SIGNAL, AND CORRESPONDING TRANSMITTER, RECEIVER, RETURN SIGNAL, AND COMPUTER PROGRAMS

(75) Inventors: Laurent Cariou, Rennes (FR); Moussa Diallo, Cesson Sevigne (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/823,958

(22) PCT Filed: Oct. 17, 2011

(86) PCT No.: PCT/FR2011/052419
§ 371 (c)(1),
(2), (4) Date: Mar. 15, 2013

(87) PCT Pub. No.: WO2012/049436
PCT Pub. Date: Apr. 19, 2012

(65) Prior Publication Data
US 2013/0177092 A1 Jul. 11, 2013

(30) Foreign Application Priority Data
Oct. 15, 2010 (FR) ...................................... 10 58434

(51) Int. Cl.
*H04B 7/24* (2006.01)
*H04L 25/02* (2006.01)
(Continued)

(52) U.S. Cl.
CPC ............ *H04B 7/0417* (2013.01); *H04L 25/023* (2013.01); *H04L 25/022* (2013.01); *H04L* (Continued)

(58) Field of Classification Search
CPC .............. H04L 25/0202; H04L 25/022; H04L 25/0224; H04L 25/02004; H04L 1/0026; H04L 1/0693

USPC ......... 375/260, 259, 219, 221, 285, 295, 316, 375/346, 347, 349, 267
See application file for complete search history.

(56) References Cited

U.S. PATENT DOCUMENTS

| 7,649,861 B2 * | 1/2010 | Maltsev et al. ............... 370/328 |
| 8,429,506 B2 * | 4/2013 | Kotecha ........................ 714/776 |
| 2009/0233559 A1 * | 9/2009 | Guey et al. ..................... 455/69 |

FOREIGN PATENT DOCUMENTS

| WO | 2006060241 A1 | 6/2006 |
| WO | 2010056763 A2 | 5/2010 |
| WO | 2011141666 A1 | 11/2011 |

OTHER PUBLICATIONS

French Search Report and Written Opinion dated Apr. 11, 2011 for corresponding French Application No. 1058434 filed Oct. 15, 2010, 7 pages.

(Continued)

*Primary Examiner* — Siu Lee
(74) *Attorney, Agent, or Firm* — David D. Brush; Westman, Champlin & Koehler, P.A.

(57) ABSTRACT

The invention relates to a method of receiving a signal corresponding to a multicarrier signal transmitted via at least one transmission channel, the method comprising an estimation step (11) of estimating said channel and delivering overall information about said channel in the frequency domain, referred to as a "frequency response" and comprising frequency samples. According to the invention, such a method also comprises:
- a sharing step (12) of sharing said frequency samples in at least two frequency sample vectors;
- a transform step (13) of transforming said frequency sample vectors from the frequency domain to a transform domain and delivering, for at least one frequency sample vector, a partial response of said channel in said transform domain; and
- a feedback step (14) of transmitting a return signal back to said transmitter, the return signal conveying samples extracted from said partial responses and representative of said channel in said transform domain.

15 Claims, 7 Drawing Sheets

(51) Int. Cl.
*H04L 27/26* (2006.01)
*H04B 7/04* (2006.01)
*H04L 5/00* (2006.01)
*H04L 1/00* (2006.01)

(52) U.S. Cl.
CPC ..... 27/263 (2013.01); *H04L 1/0026* (2013.01); *H04L 25/0204* (2013.01); *H04L 5/0025* (2013.01); *H04L 27/2647* (2013.01); *H04L 27/2639* (2013.01); *H04L 5/0044* (2013.01)
USPC ........... 375/260; 375/259; 375/219; 375/221; 375/285; 375/295; 375/316; 375/346; 375/347; 375/349; 375/267

(56) References Cited

OTHER PUBLICATIONS

International Search Report dated Dec. 6, 2011 for corresponding International Application No. PCT/FR2011/052419 filed Oct. 17, 2011, 4 pages.

International Preliminary Report on Patentability and English Translation of the Written Opinion dated Apr. 16, 2013 for corresponding International Patent Application No. PCT/FR2011/052419 filed Oct. 17, 2011, 8 pages.

\* cited by examiner

METHODS OF TRANSMITTING AND RECEIVING A MULTICARRIER SIGNAL, AND CORRESPONDING TRANSMITTER, RECEIVER, RETURN SIGNAL, AND COMPUTER PROGRAMS

CROSS-REFERENCE TO RELATED APPLICATIONS

This Application is a Section 371 National Stage Application of International Application No. PCT/FR2011/052419, filed Oct. 17, 2011, and published as WO 2012/049436 A1 on Apr. 19, 2012, not in English, the contents of which are hereby incorporated by reference in their entireties.

1. FIELD OF THE INVENTION

The field of the invention is that of digital communications, and more particularly of communications requiring knowledge of the transmission channel on transmission.

More precisely, the invention relates to transmitting and receiving a multiple carrier signal that makes it possible, at the transmitter, to estimate the transmission channel by means of information returned in a return signal from the receiver, also known as "feedback".

Applications of the invention lie in particular in single-user multiple-input multiple-output (MIMO) type transmission systems, e.g. making use of beams (specifically "beam forming") or multi-user MIMO type transmission systems, e.g. using a space division multiple access (SDMA) type technique, or involving information allocation algorithms (also known as "bit loading").

In particular, the invention finds applications in transmission systems in compliance with the IEEE 802.11n standard and future versions thereof, in particular the 802.11ac and 801.11ad versions, and also future generation cellular transmission systems (also known as long term evolution (LTE) advanced) that make use of the SDMA technique.

2. PRIOR ART

Transmission techniques requiring knowledge of the transmission channel on transmission present numerous advantages.

For example, the so-called "beam-forming" technique makes it possible to focus the transmitted power on a particular receiver, and thus to increase the signal-to-noise ratio on reception. As a result, it is possible to transmit data with faster modulation. The transmission data rate obtained with that beam-forming technique, which requires knowledge of the channel on transmission (i.e. with feedback), is thus faster than the transmission data rate obtained in a transmission system without knowledge of the channel on transmission (i.e. without feedback), such as MIMO space division multiplexing.

In order to obtain knowledge of the transmission channel on transmission, it is conventional to perform a prior probing stage before the stage of transmitting data, and to estimate the transmission channel at the receiver by making use of pilots transmitted by the transmitter, with this information then being encoded and sent back to the transmitter by a return path for decoding at the transmitter. This mode of estimating the channel and of informing the transmitter is sometimes referred to as "explicit feedback".

Unfortunately, the quantity of information for relaying over the return path in that mode can easily become very great, given a large number of carriers, a larger number of MIMO subchannels between the various inputs and the various outputs, a large number of users, etc. The time needed for sending such return information back to the transmitter, and thus the duration of the probing stage, therefore become ever longer, thereby affecting the overall efficiency of transmission.

It is therefore desirable to compress the return information in order to reduce the time required to relay the feedback.

For this purpose, several techniques have been proposed, in particular in version 802.11n of the WiFi standard. Nevertheless, it is desirable to further reduce that quantity of information. The greater the quantity of information, the longer the duration of the probing stage, and that reduces the time during which high data rate transmission can take place. The effectiveness of the transmission system is therefore degraded, since no useful information is transmitted during the probing stage.

In particular, if the duration of the probing stage is too long, the loss of data rate caused by probing can consume all of the improvements in data rate that are obtained on transmission by using a technique requiring knowledge of the channel on transmission (i.e. a feedback technique).

Furthermore, with present and future techniques, the number of transmit and/or receive antennas are increasing, thereby increasing the numbers of carriers, possibly accompanied by an increase in the number of users (as applies in particular with SDMA).

The quantity of information that needs to be returned to the transmitter is thus ever increasing, thereby reducing the effectiveness of novel transmission systems. Such novel systems, which transmit at very high data rates, are correspondingly more sensitive to losses of time due to feeding back information.

The inventors of the present application have already made proposals in French patent applications FR 10/53696 filed on May 11, 2010 and FR 10/58431 filed on Oct. 15, 2010 for a transmission/reception technique that makes it possible to reduce the quantity of information sent back over the return path, which technique relies on feedback transmission of information about the transmission channel in a transform domain, and not in the frequency domain.

In that technique, it is possible to transmit information about the channel in its time form (impulse response), by using a specific transfer function based on a Fourier transform for converting the response of the channel from the frequency domain to the time domain. It is also possible to transmit the information about the channel in its form in the transform domain, by using a specific transfer function, e.g. based on a cosine transform for converting the response of the channel from the frequency domain to the transform domain.

That technique presents very good performance and a very effective compression factor. Nevertheless, the associated transfer function is relatively complex to construct.

There therefore exists a need for a novel transmission/reception technique in transmission systems requiring knowledge about the channel on transmission, that enables the quantity of information sent back over the return path to be reduced and that presents little complexity.

3. SUMMARY OF THE INVENTION

The invention proposes a novel solution that does not present all of those drawbacks of the prior art, the solution being in the form of a method of receiving a signal corresponding to a multicarrier signal transmitted by a transmitter via at least one transmission channel and comprising an estimation step of estimating the channel by delivering overall information about the channel in the frequency domain, referred to as the "frequency response" and comprising frequency samples.

According to the invention, such a method also comprises:
a sharing step of sharing frequency samples among at least two frequency sample vectors, it being possible for a given frequency sample to belong to a plurality of frequency sample vectors;
a transform step of transforming the frequency sample vectors from the frequency domain to a transform domain and delivering, for at least one frequency sample vector, a partial response of the channel in the transform domain; and
a feedback step of sending a return signal back to said transmitter, the return signal conveying samples extracted from the partial responses and representative of the channel in the transform domain.

The invention thus proposes "fragmenting" the information about the channel as conventionally obtained in the frequency domain, and converting the fragmented information from the frequency domain to a transform domain in order to return that information to the transmitter while the information is in the transform domain.

In other words, instead of working over the entire frequency band of the channel, the band is subdivided into subbands, and the partial responses of the channel obtained for each subband of the frequency domain are transformed to the transform domain. Samples extracted from the various partial responses and representative of the channel in the transform domain are then fed back to the transmitter.

By sending back information about the channel in a form that is fragmented and that is in a transform domain, the quantity of information that needs to be sent back from the receiver to the transmitter is reduced, as is the complexity of determining the information.

In particular, by sharing frequency samples of the frequency response among a plurality of frequency sample vectors (also referred to as "blocks") it is possible to reduce the size of the transfer matrices used while transforming from the frequency domain to the transform domain, thereby reducing the complexity of calculation. Furthermore, the quantity of information sent back from the receiver to the transmitter is limited to $\Delta \times 2CP/\Delta$ samples in the transform domain (or $\Delta \times CP/\Delta$ in the time domain), where CP is the length of the guard interval measured as a number of samples in the time domain, and $\Delta$ is the number of frequency sample vectors.

It should also be recalled that the size of a multicarrier symbol is conventionally $2^k$. However, the number Nmod of carriers modulated by non-null values is generally less than $2^k$ because of the presence of carriers modulated by null values at the margins of the spectrum. Subdividing into blocks makes it possible to work once more on vectors that present a length that is a power of 2, in particular by taking into consideration vectors that overlap. In this way, during the step of transforming the various blocks, it is possible to make use of fast transform algorithms of the fast Fourier transform (FFT) and inverse FFT (iFFt) type, or of the fast discrete cosine transform (FDCT) and inverse FDCT (iFDCT) type.

According to a particular characteristic, the frequency response comprises N frequency samples, where N is the number of carriers of a pilot symbol of the multicarrier signal, and the said sharing step shares among the frequency sample vectors only those Np frequency samples that correspond to the positions of carriers of the pilot symbol that are modulated by pilots dedicated to estimating the channel (Np<N).

Under such circumstances, null carriers are excluded from the frequency sample vectors. Furthermore, certain frequency sample vectors that are obtained overlap. In other words, some of the frequency samples belong to at least two frequency sample vectors.

Using a plurality of frequency sample vectors thus makes it possible to average the noise power over N samples in the transform domain while applying "conventional" transfer functions to the frequency sample vectors.

It should be observed that the number and the size of the frequency sample vectors depend on the capacity of the transmission system. In particular, these parameters vary as a function of the characteristics of the transmitter and/or of the receiver and/or on the characteristics of a transfer function between the frequency domain and the transform domain.

Preferably, the number of frequency sample vectors is a power of 2.

In particular, the number $\Delta$ of frequency sample vectors depends on the number of carriers in a multicarrier symbol that are modulated by a null value (N-Nmod). The greater the number of null carriers, the greater the advantage of having a large number of frequency sample vectors. In the same manner, the less robust the transmission against edge effects, the more it is advantageous to have frequency sample vectors that overlap, and thus a large number of frequency sample vectors (e.g. 8). It is also necessary for the number of samples in the frequency response to be a multiple of $\Delta$.

The size of the frequency sample vectors depends on the number Nmod of carriers of a pilot symbol that are modulated by a non-null value and on the number Np of carriers of the pilot symbol that are modulated by pilots dedicated to estimating the channel.

Thus, when Nmod is equal to Np, each frequency sample vector comprises $N/\Delta$ frequency samples. When Nmod is greater than Np, each frequency sample vector comprises $$\frac{N/\delta}{\Delta}$$

frequency samples, where $\delta$ is the ratio between Nmod and Np.

In a first implementation, the transform step uses an inverse Fourier transform that delivers, for each frequency sample vector, a partial response of the channel in the time domain.

Under such circumstances, each partial response comprises samples representative of the channel and located in an interval presenting a length that is less than or equal to $CP/\Delta$.

In particular, if Nmod is equal to Np, the transform step performs multiplication of each of the frequency sample vectors by an inverse Fourier matrix of size $N/\Delta \times N/\Delta$. In a variant, the transform step performs multiplication of each of the frequency sample vectors by a transfer matrix of size $N/\Delta \times CP/\Delta$ that has been extracted from a Fourier matrix of size $N/\Delta \times N/\Delta$ in which only the first $CP/\Delta$ columns have been retained.

If Nmod is greater than Np, the transform step performs multiplication of each frequency sample vector by an inverse Fourier matrix of size $$\frac{N/\delta}{\Delta} \times \frac{N/\delta}{\Delta}.$$

In a variant, the transform step performs multiplication of each of the frequency sample vectors by a transfer matrix of size $$\frac{N/\delta}{\Delta} \times \frac{CP}{\Delta}$$

that has been extracted from a Fourier matrix of size $$\frac{N/\delta}{\Delta} \times \frac{N/\delta}{\Delta}$$

in which only the first CP/Δ columns have been retained.

In a second implementation, the transform step uses a cosine transform that delivers, for each frequency sample vector, a partial response of the channel in a transform domain.

Under such circumstances, each partial response comprises samples representative of the channel and located in an interval presenting a length that is less than or equal to 2CP/Δ.

The use of a cosine transform presents several advantages. Firstly, such a transform is less sensitive to edge effects than is a Fourier transform. In addition, the matrix representative of such a transform is real. It is therefore less complex than a Fourier matrix.

In particular, if Nmod is equal to Np, the transform step performs multiplication of each of the frequency sample vectors by a matrix representative of a cosine transform and of size N/Δ×N/Δ. In a variant, the transform step performs multiplication of each of the frequency sample vectors by a transfer matrix of size N/Δ×2CP/Δ that has been extracted from a matrix representative of a cosine transform and of size N/Δ× N/Δ, from which only the first 2CP/Δ columns have been retained.

If Nmod is greater than Np, the transform step performs multiplication of each of the frequency samples by a matrix representative of a cosine transform of size $$\frac{N/\delta}{\Delta} \times \frac{N/\delta}{\Delta}.$$

In a variant, the transform step performs multiplication of each of the frequency sample vectors by a transfer matrix of size $$\frac{N/\delta}{\Delta} \times \frac{2CP}{\Delta}$$

extracted from a matrix representative of a cosine transform of size $$\frac{N/\delta}{\Delta} \times \frac{N/\delta}{\Delta}$$

from which only the first 2CP/Δ columns have been retained.

In another implementation, the frequency response of the channel comprises N frequency samples, and the sharing step shares the N frequency samples among Δ frequency sample vectors of size N/Δ.

Under such circumstances, the frequency sample vectors that are obtained do not overlap. In other words, each frequency sample belongs to only one frequency sample vector. Furthermore, the null carriers are incorporated in the frequency sample vectors.

This implementation is particularly adapted to using so-called "optimized" transfer functions.

In particular, the reception method of the invention uses a step of processing frequency sample vectors prior to the feedback step in which each frequency sample vector is associated with a modified vector comprising only the frequency samples that correspond to the positions of the Np carriers of the pilot symbol that are modulated by pilots dedicated to estimating the channel.

Under such circumstances, the transform step uses a transfer matrix for each modified vector and constructed while taking account of the positions of the Np carriers that are modulated by pilots dedicated to estimating the channel.

For example, the reception method comprises a step of constructing at least one transfer matrix by performing the following substeps:
  obtaining a reduced matrix extracted from a matrix representative of a transform of size N/Δ×N/Δ, from which the elements corresponding to the positions of the Np carriers modulated by pilots dedicated to estimating the channel have been retained;
  decomposing the reduced matrix into eigenvalues; and
  determining the transfer matrix from a set of eigenvalues selected from among said eigenvalues.

This new transfer matrix serves to improve the accuracy of the information that is transmitted by feedback, i.e. to feedback information to the transmitter that enables the channel to be estimated better. This serves to improve the quality of the feedback.

For example, the matrix representative of a transform is an inverse Fourier matrix or a matrix representative of a cosine transform.

In a variant, the reduced matrix is obtained by retaining the elements that correspond to the positions of the Np carriers modulated by pilots dedicated to estimating the channel, and by retaining only the first CP/Δ columns if the matrix representative of a transform is an inverse Fourier matrix, or only the first 2CP/Δ columns if the matrix representative of a transform is a matrix representative of a cosine transform.

In another aspect, the invention provides a receiver of a signal corresponding to a multicarrier signal transmitted by a transmitter over at least one transmission channel, said receiver comprising channel estimation means that deliver overall information about the channel in the frequency domain, referred to as the "frequency response" and comprising frequency samples.

According to the invention, such a receiver also comprises:
  means for sharing frequency samples among at least two frequency sample vectors, it being possible for a given frequency sample to belong to a plurality of frequency sample vectors;
  transform means for transforming the frequency sample vectors from the frequency domain to a transform domain and delivering, for at least one frequency sample vector, a partial response of the channel in the transform domain; and
  feedback means for sending a return signal back to said transmitter and conveying at least samples extracted from the partial responses and representative of the channel in the transform domain.

Such a receiver is adapted in particular for performing the above-described reception method. By way of example, it comprises an access point of a WiFi network for an up link, or a station providing a set of base services of a WiFi network, for a down link.

Naturally, the receiver may include the various characteristics relating to the reception method of the invention. Thus, the characteristics and advantages of the receiver are the same as those of the reception method, and they are not described in greater detail.

The invention also provides a return signal transmitted by the above-described reception method and conveying at least samples extracted from the partial responses and representative of the channel in the transform domain. In a degraded mode of the invention, the return signal may convey time samples that are representative of noise.

In particular, when the feedback is performed by sending the first CP samples of the time response of the channel, or the first 2CP samples of the response of the channel in the transform domain using the technique of feeding back an overall response about the channel in a transform domain, the invention proposes transmitting D sets of CP/$\Delta$ samples of the time response of the channel, or 2CP/$\Delta$ samples of the response of the channel in the transform domain, thereby making it possible to average out noise and to reduce complexity.

Such a return signal may naturally include the various characteristics relating to the above-described reception method. By way of example, it may be a channel quality indicator (CQI) message.

The invention also provides a method of transmitting a multicarrier signal over at least one transmission channel, the method comprising the following steps:
 receiving a return signal sent back in accordance with the above-described reception method and delivering at least two sets comprising samples representative of the channel in the transform domain and each associated with a distinct partial response;
 transforming the sets to the frequency domain, thereby delivering frequency sample vectors; and
 recombining the frequency sample vectors, thereby delivering overall information about the channel in the frequency domain.

In addition to the operations that are conventionally performed on transmission, the invention proposes transforming the partial information about the channel as conveyed by the return signal from the time domain to the frequency domain, and then recombining the partial information as obtained in this way in the frequency domain in order to obtain overall information about the channel. Each block is thus processed independently before the blocks are reassembled.

In this way, good knowledge about the channel is available on transmission. Transmitting information about the channel in a transform domain in the return signal serves to provide a better estimate of the channel because of the accuracy of the information obtained on reception. This increases the effectiveness of systems that require knowledge of the channel on transmission.

In addition, it is possible to reuse all of the existing functions for shaping the multicarrier signal on transmission.

For example, the transform step performs the following steps for at least one set comprising samples representative of the channel in the transform domain:
 constructing a sample vector in the transform domain and of size N/$\Delta$, the vector comprising said set and null elements; and
 multiplying the sample vector in the transform domain by a transfer matrix of size N/$\Delta \times$N/$\Delta$, thereby delivering a frequency sample vector of size N/$\Delta$.

In another example, for at least one set comprising samples representative of the channel in the transform domain, the transform step performs a step of multiplying said set in the transform domain by a transfer matrix of size CP/$\Delta \times$N/$\Delta$ that is extracted from a matrix representative of a transform of size N/$\Delta \times$N/$\Delta$, thereby delivering a frequency sample vector of size N/$\Delta$.

In these examples, the matrix representative of a transform is a Fourier matrix or a matrix representative of an inverse cosine transform.

In another implementation of the invention, the recombination step uses concatenation of the frequency sample vectors. In other words, the frequency sample vectors regenerated at the transmitter are put end-to-end, taking their indices into account.

In particular, when an overall vector obtained by concatenating frequency sample vectors presents a number of frequency samples that is greater than the number of carriers Np of a pilot symbol, the recombination step allocates a null value to the frequency samples of the overall vector. In this way, the vector obtained at the end of the recombination step comprises Np frequency samples.

According to yet another implementation of the invention, when a frequency sample belongs to a plurality of frequency sample vectors, the recombination step averages the values given to this frequency sample in the various frequency sample vectors.

In a variant, when a frequency sample belongs to a plurality of frequency sample vectors, the recombination step selects one of the values among the values given to the frequency sample in the various frequency sample vectors.

In another aspect, the invention provides a transmitter of a multicarrier signal over at least one transmission channel, the transmitter comprising:
 receiver means as described above for receiving a return signal sent back by a receiver and delivering at least two sets comprising samples representative of the channel in the transform domain, each set being associated with a distinct partial response;
 transform means for transforming the sets to the frequency domain and delivering frequency sample vectors; and
 recombination means for recombining the frequency sample vectors and delivering overall information about the channel in the frequency domain.

Such a transmitter is in particular adapted to perform the above-described transmission method. By way of example, for a down link it may be an access point to a WiFi network, or for an up link it may be a station for a set of base services of a WiFi network.

The transmitter may naturally include the various characteristics relating to the transmission method of the invention. Thus, the characteristics and advantages of the transmitter are the same as those of the transmission method, and they are not described in greater detail.

Another aspect of the invention provides a computer program including instructions for performing the above-described transmission method and/or reception method when the program is executed by a processor. Such a program can use any programming language. It may be downloaded from a communications network and/or it may be recorded on a computer readable medium.

4. LIST OF FIGURES

Other characteristics and advantages of the invention appear more clearly on reading the following description of a particular embodiment, given merely by way of illustrative and non-limiting example, and of the accompanying drawings, in which:

FIGS. 1 and 2 show the main steps performed respectively by the reception method and by the transmission method of the invention;

FIGS. 3A, 3B, and 4 show a first implementation performing a conventional Fourier transform type transfer function for Np=Nmod (FIGS. 3A and 3B) or for Np<Nmod (FIG. 4);

FIGS. 5A, 5B, and 6 show a second implementation performing a conventional cosine transform type transfer function for Np=Nmod (FIGS. 5A and 5B) or for Np<Nmod (FIG. 6);

5. DESCRIPTION OF AN EMBODIMENT OF THE INVENTION

5.1 Notation

Figure 1:
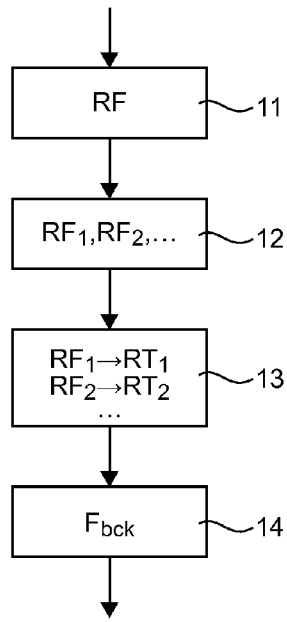

In order to make the document easier to read, there follows a description of the notation used.

Consideration is given to a multicarrier signal made up of a time succession of multicarrier symbols. Some multicarrier symbols in the signal comprise carriers modulated by reference elements referred to as "pilots", that are known at least to one of the receivers that is to receive the multicarrier signal. Such symbols are called pilot symbols.

The following notation is used:

N is the number of subcarriers (also known as carriers) for a multicarrier symbol (corresponding to the size of the modulation);

Nmod is the number of carriers modulated by a non-null value for a multicarrier symbol;

(N-Nmod) is the number of carriers modulated by a null value and located at the edges of the spectrum of the multicarrier signal and/or at the center of the spectrum (also referred to as null carriers or as unmodulated carriers);

Np is the number of carriers modulated by a pilot that is dedicated to estimating the channel while it is in use, with a pilot symbol (Np≤Nmod);

δ is the ratio of Nmod to Np;

CP is the number of samples in the guard interval (or cyclic prefix) of the multicarrier signal; and Δ is the number of frequency sample vectors.

It should be recalled that, in present transmission systems, it is conventional to insert null carriers into the margins of the spectrum of the multicarrier signal, in particular in order to avoid spectrum overlap with other applications using adjacent frequency bands. It is also conventional to insert a null carrier in the middle of the spectrum of the multicarrier signal (DC). The number N of carriers of a multicarrier symbol is therefore generally greater than the number Nmod of carriers modulated by a non-null value (N>Nmod).

Furthermore, and, by way of example, with MIMO it is possible to have a multicarrier symbol in which the Nmod carriers modulated by a non-null value are pilots. Nevertheless, some of those pilots may be used for estimating a transmission channel between one transmit and receive antenna pair, while others are used for estimating another transmission channel between another transmit and receive antenna pair. Under such circumstances, Np is used to designate the number of pilots corresponding to the channel being estimated.

5.2 General Principle

The invention lies in the context of communications requiring knowledge of the transmission channel on transmission, in which at least one transmission channel is defined between a transmitter (having one or more transmit antennas) and a receiver (having one or more receive antennas).

The general principle of the invention relies on information being sent back from the receiver to the transmitter about at least one transmission channel, the information being sent in its form in a transform domain (such as the time domain), and not in its frequency domain form, thereby enabling the information that is sent back over the return path to be compressed.

Furthermore, the information about the channel that is obtained in the frequency domain at the receiver is previously subdivided into a plurality of "partials" in the frequency domain, prior to being converted into the transform domain, thereby making it possible to reduce the complexity of this feedback technique.

FIG. 1 shows the main steps performed by a method of receiving a signal corresponding to a multicarrier signal, e.g. of the orthogonal frequency division multiplex (OFDM) type, as transmitted by a transmitter over at least one transmission channel in an implementation of the invention. Such a method of the invention may be performed in various manners, in particular in hardwired form or in software form.

In this implementation, the transmission channel is estimated during an estimation step 11, thereby obtaining overall information about the channel in the frequency domain, known as the frequency response RF. This estimate of the channel is obtained in conventional manner, e.g. by using the Np pilots dedicated to estimating this channel of the multicarrier signal.

The frequency response RF may be presented directly in sampled form at the end of the estimation step, or it may be subjected to a sampling step, so as to be expressed in the form of a set of frequency samples.

During a following sharing step 12, the frequency samples of the frequency response RF are shared among at least two frequency sample vectors ($RF_1$, $RF_2$, . . . ). It should be observed that it is possible for a given frequency sample to belong to a plurality of frequency sample vectors.

Thereafter, the frequency sample vectors ($RF_1$, $RF_2$, . . . ) are transformed from the frequency domain to a transform domain during a transform step 13, thereby obtaining, for at least one frequency sample vector, a partial response of the channel in the transform domain ($RT_1$, $RT_2$, . . . ). For example, such a transform may be of the Fourier transform type, of the cosine or sine transform type, of the wavelet transform type, etc.

The partial responses of the channel in the transform domain ($RT_1$, $RT_2$, . . . ) as obtained in this way include both samples representative of the channel and samples representative of noise in the transform domain.

During a feedback step 14, at least the samples representative of the channel in the transform domain as extracted from the partial responses are sent back to the transmitter in a return signal, also referred to as feedback Fbck.

In this implementation, the samples representative of the channel in the transform domain, corresponding to the useful energy of the channel, are located in an interval that presents a length, expressed as a number of samples, that, by way of example, is less than or equal to $2CP/\Delta$ if using cosine transform, or less than or equal to $CP/\Delta$ if using a Fourier transform.

Figure 2:
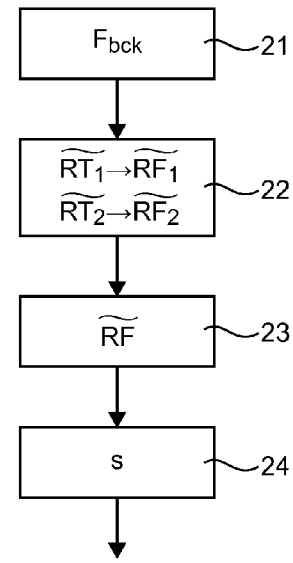

FIG. 2 shows the main steps performed by a method of transmitting a corresponding multicarrier signal in an implementation of the invention. Such a method may be performed in various manners, in particular in hardwired form or in software form.

More precisely, in order to adapt the transmission to the transmission channel, such a method performs the following steps:

receiving 21 a feedback signal as sent back using the above-described reception method, thereby obtaining at least two sets of samples representative of the channel in the transform domain, each set being associated with a distinct partial response;

transforming 22 the sets into the frequency domain, thereby obtaining frequency sample vectors (RF1, RF2, etc.);

recombining 23 the frequency sample vectors, thereby obtaining overall information about the channel in the frequency domain; and optionally, shaping 24 the multicarrier signal so as to take the overall information into account.

5.3 Using Conventional Transfer Functions

There follows a description of two implementations of the invention, one performing a "conventional" Fourier transform, and the other performing a "conventional" cosine transform during the steps of transforming between the frequency domain and the transform domain.

A) Transform Using a Fourier Transform

A first implementation of the invention is described with reference to FIGS. 3A, 3B, and 4, this implementation being based on using a Fourier transform.

1. Np=Nmod

Figure 3A:
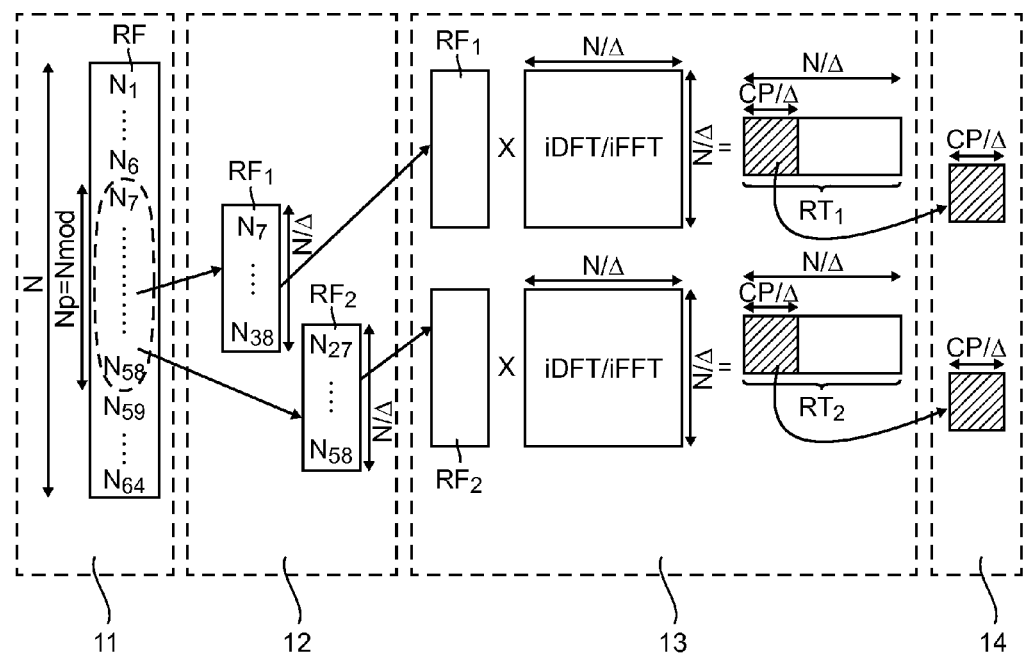
Figure 3B:
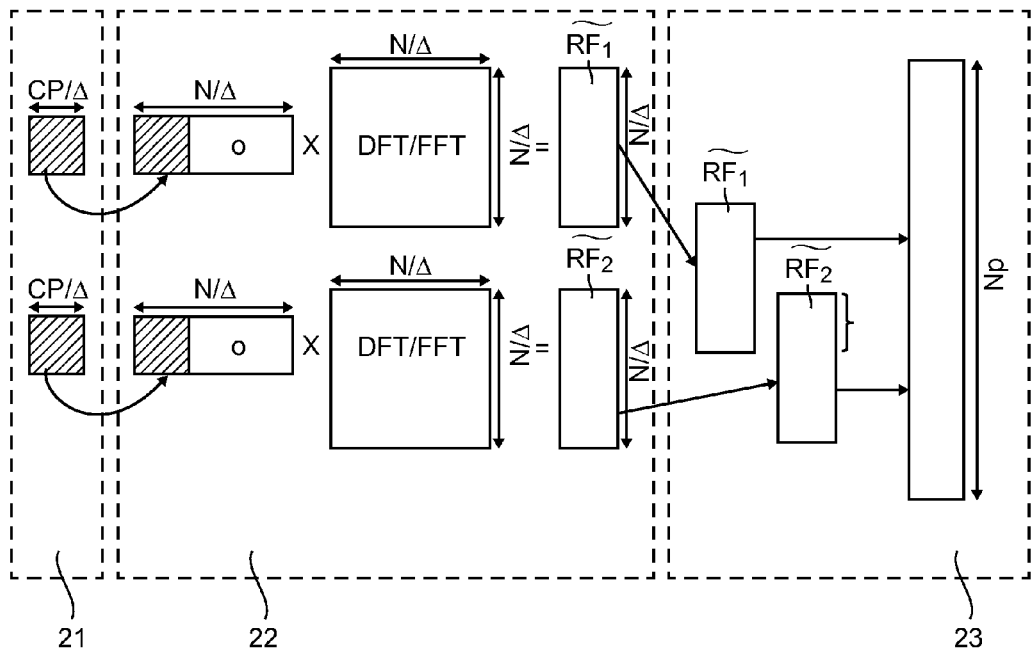

In this first implementation, it is also assumed that Np is equal to Nmod, as shown in FIGS. 3A and 3B. Furthermore, it is assumed that null carriers are inserted at the margins and/or in the middle of the spectrum of the multicarrier signal (Nmod<N).

By way of example, N is equal to 64 and Nmod is equal to 52.

As shown in FIG. 3A, at the receiver end (e.g. a station), the frequency response RF of the transmission channel obtained at the end of the estimation step 11 in its sampled form comprises N frequency samples, written N1, N2, . . . , N64.

The sharing step 12 then shares Np frequency samples taken from the N frequency samples among frequency sample vectors, the samples corresponding to the positions of carriers of the pilot symbol that are modulated by pilots dedicated to estimating the channel. It is in these positions that the useful energy of the multicarrier signal is concentrated. At the end of the sharing step, this implementation thus produces $\Delta$ frequency sample vectors each having $N/\Delta$ frequency samples. In this example, some of the frequency samples belong to a plurality of frequency sample vectors, since Np=Nmod<N.

As mentioned above, the number of frequency sample vectors is preferably a power of 2 ($\Delta$=2, 4, 8, 16, . . . ). This number is determined by taking account of the characteristics of the transmitter and/or the receiver (number of transmit and/or receive antennas, modulation/demodulation used, etc.), and/or of the characteristics of the transfer function between the frequency domain and the transform domain. Thus, for a transfer function of the Fourier type, sharing the frequency samples into two vectors is most appropriate.

In the example shown in FIG. 3A, the number $\Delta$ of frequency sample vectors is therefore equal to 2. Each frequency sample vector then has $N/\Delta$=32 frequency samples, the first frequency sample vector RF1 having the samples corresponding to the positions of the 32 first pilots dedicated to estimating the channel (corresponding to the positions:

$$N_{\frac{N-N_{mod}}{2}+1} \text{ to } N_{\frac{N-N_{mod}}{2}+\frac{N}{2}}$$

i.e. N7 to N38), and the second frequency sample vector RF2 comprising the samples corresponding to the positions of the last 32 pilots dedicated to estimating the channel (corresponding to the positions:

$$N_{N-\left(\frac{N-N_{mod}}{2}\right)-\frac{N}{2}+1} \text{ to } N_{N-\left(\frac{N-N_{mod}}{2}\right)}$$

i.e. N27 to N58). It can be seen that these two frequency sample vectors RF1 and RF2 overlap, with the frequency samples N27 to N38 belonging to both frequency sample vectors.

During a following transform step 13, an inverse Fourier transform is applied to the frequency sample vectors RF1 and RF2, thereby obtaining, for each frequency sample vector, a partial response of the channel in the time domain, written respectively RT1 and RT2. For example, such a Fourier transform is of the inverse discrete Fourier transform (iDFT) or the inverse fast Fourier transform (iFFT) type.

Under such circumstances, each partial response has time samples representative of the channel that are located in an interval presenting a length (as a number of time samples) that is shorter than or equal to the length of the guard interval CP of the multicarrier signal divided by $\Delta$.

As shown in FIG. 3A, the transform step 13 may, for example, perform multiplication of each of the frequency sample vectors by a transfer matrix of the inverse Fourier matrix type that is of size $N/\Delta \times N/\Delta$. Each of the partial responses RT1 and RT2 of the channel in the time domain as obtained in this way comprises $N/\Delta$ time samples, made up of time samples representative of the channel that are located in the interval CP/$\Delta$ and time samples that are representative of noise in the interval (N−CP)/$\Delta$.

During the feedback step 14 of sending back a return signal, there is no need to return the time samples representative of noise to the transmitter. As a result, either the CP/$\Delta$ first time samples of the various partial responses (corresponding to the shaded portions in FIG. 3A) are sent back, or else only the time samples representative of the channel and located in the interval CP/$\Delta$ are sent back.

In a variant that is not shown, the transform step 13 performs multiplication of each of the frequency sample vectors by a transfer matrix of size $N/\Delta \times CP/\Delta$ that is extracted from an inverse Fourier matrix of size $N/\Delta \times N/\Delta$ in which only the CP/$\Delta$ first columns have been retained. Since the partial responses RT1 and RT2 of the channel in the time domain as obtained in this way then comprise once more time samples representative of the channel that are located in the CP/$\Delta$ first samples, the samples of the partial responses RT1 and RT2 that are transmitted to the transmitter are either the CP/$\Delta$ time samples or else only the time samples that are representative of the channel and located in the interval CP/$\Delta$.

As shown in FIG. 3B, at the transmitter (e.g. an access point), the received return signal (21) comprises at least two sets of samples representative of the channel in the transform domain, each associated with a distinct partial response. Each set comprises CP/$\Delta$ time samples, or else only those time samples that are representative of the channel and located in the interval CP/$\Delta$.

These sets are then transformed from the time domain into the frequency domain, using a transform that is the inverse of that which was used at the receiver end (e.g. a Fourier transform of the digital Fourier transform (DFT) or of the fast Fourier transform (FFT) type).

More precisely, in the example of FIG. 3B, the transform step 22 implements the following steps, on at least one of the sets:

constructing a sample vector of size N/Δ in the transform domain, the vector comprising said set (made up of CP/Δ time samples or of only those time samples that are representative of the channel and that are located in the interval CP/Δ) and of null elements. In other words, the set in the transform domain is "built out" in order to obtain a sample vector in the transform domain that has N/Δ samples (32 in the example shown), by adding null elements after the CP/Δ time samples or after the time samples that are representative of the channel and located in the interval CP/Δ; and multiplying by a transfer matrix of size N/Δ×N/Δ (FFT or DFT), thereby obtaining a frequency sample vector of size N/Δ.

This produces two frequency sample vectors $\widetilde{RF1}$ and $\widetilde{RF2}$, each comprising N/Δ=32 frequency samples, corresponding to the frequency sample vectors RF1 and RF2 obtained at the receiver end.

During the following recombination step 23, the frequency sample vectors are recombined in order to obtain overall information about the channel in the frequency domain on Np frequency samples.

In particular, when a frequency sample belongs to a plurality of frequency sample vectors, the recombination step can average the values given to such a sample in the various frequency sample vectors. For example, frequency samples N27 to N38 belong to both of the frequency vectors $\widetilde{RF1}$ and $\widetilde{RF2}$. The "overall" vector corresponding to combining the frequency sample vectors $\widetilde{RF1}$ and $\widetilde{RF2}$ and comprising Np=52 frequency samples then comprises:

in positions N7 to N26: the values of the frequency sample vector $\widetilde{RF1}$ in those positions;

in positions N39 to N58: the values of the frequency sample vector $\widetilde{RF2}$ in those positions; and in positions N27 to N38: for each position, the average of the value from the frequency sample vector $\widetilde{RF1}$ and the value from the frequency sample vector $\widetilde{RF2}$ in that position.

In a variant, the recombination step 23 selects one value from the values allocated to that sample in the various frequency sample vectors.

Thus, by way of example, the global vector comprises:

in positions N7 to N38: the values of the frequency sample vector $\widetilde{RF1}$ in those positions; and in positions N39 to N58: the values of the frequency sample vector $\widetilde{RF2}$ in those positions.

The multicarrier signal can then be shaped (24) by taking this overall information into account.

If, in the variant shown with reference to the receiver, the transform step 13 performs multiplication of each of the frequency sample vectors by a transfer matrix of the inverse Fourier matrix type of size N/Δ×CP/Δ as extracted from an inverse Fourier matrix of size N/Δ×N/Δ and in which only the CP/Δ first columns have been retained, then there is no need to add null elements in order to construct the sample vectors in the transform domain of size N/Δ during the transform step 22.

Each of the partial responses RT1 and RT2 of the channel in the time domain as obtained in this way comprise CP/Δ time samples. In this variant, at least one set of samples in the transform domain is thus multiplied directly by a transfer matrix of size CP/Δ×N/Δ as extracted from a Fourier matrix of size N/Δ×N/Δ (FFT or DFT) from which only the CP/Δ first rows are retained, in order to obtain a frequency sample vector of size N/Δ.

2. Nmod>Np

Figure 4:
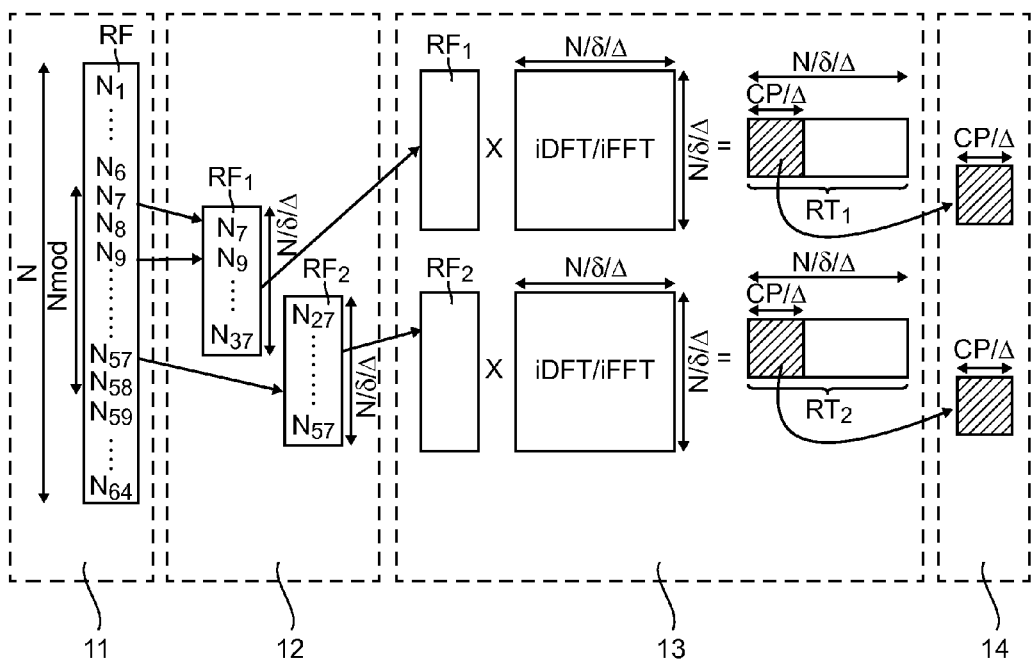

It is assumed below that Nmod is greater than Np, as shown in FIG. 4.

By way of example, the pilots dedicated to estimating the transmission channel are shared over a pilot symbol using a regular pattern. Thus, NP=Nmod/δ with 1/δ being the pilot repetition factor. Furthermore, null carriers are inserted in the margins and/or in the middle of the spectrum of the multicarrier signal (Nmod<N).

By way of example, N is equal to 64, Nmod is equal to 52, and the pilot repetition factor is equal to ½. This gives Np equal to 26. In this example, a pilot symbol comprises alternating pilots dedicated to estimating the transmission channel and written P, and useful data or else pilots dedicated to estimating another transmission channel and written D.

As shown in FIG. 4, at the receiver end, the frequency response RF of the transmission channel as obtained at the end of the estimation step 11 in its sampled form comprises N frequency samples, written N1, N2, . . . , N64.

Of these N=64 frequency samples, the first six (N1 to N6) and the last six (N59 to N64) correspond to the positions of carriers modulated by a null value of a multicarrier symbol of the signal. The remaining Nmod=52 samples correspond to positions of carriers modulated by non-null values of the multicarrier symbol (P or D). For example, among these 52 remaining frequency samples, samples of odd index (N7, N9, N11, . . . , N57) correspond to pilots P, while samples of an even index (N8, N10, N12, . . . , N58) correspond to useful data D.

The sharing step 12 thus shares among Δ frequency vectors the Np frequency samples corresponding to the positions of the carriers that are modulated by pilots P dedicated to estimating the channel P. It is at these positions that the useful energy of the multicarrier signal is concentrated.

In the example shown in FIG. 4, Δ is equal to 2. It should be recalled that sharing frequency samples among two vectors is well adapted to a Fourier type transform. Each frequency sample vector then comprises $$\frac{N/\delta}{\Delta} = 16$$

frequency samples, the first frequency sample vector RF1 having the samples corresponding to the positions of the first 16 pilots P dedicated to estimating the channel (corresponding to the positions having odd indices N7, N9, N11, . . . , N35, N37), and the second frequency sample vector RF2 comprising the 16 samples corresponding to the last 16 pilots P dedicated to estimating the channel (corresponding to the positions having odd indices N27, N29, N31, . . . , N55, N57). It can be seen that these two frequency sample vectors RF1 and RF2 overlap, with the frequency samples N27, N29, N31, N33, N35, and N37 belonging to both frequency sample vectors RF1 and RF2.

During a following transform step 13, an inverse Fourier transform is applied to the frequency sample vectors RF1 and RF2, thereby obtaining, for each frequency sample vector, respective partial responses of the channel in the time domain, the partial responses being written RT1 and RT2, respectively. For example, such a Fourier transform is of the iDFT or of the iFFT type.

Under such circumstances, each partial response comprises time samples representative of the channel and located in an interval of length (measured as a number of time samples) that is less than or equal to CP/Δ, with Np>CP.

As shown in FIG. 4 and by way of example, the transform step 13 performs a multiplication of each of the frequency sample vectors by a transfer matrix of the inverse Fourier matrix type of size $$\frac{N/\delta}{\Delta} \times \frac{N/\delta}{\Delta}.$$

Each of the partial responses RT1 and RT2 of the channel in the time domain as obtained in this way comprise $$\frac{N/\delta}{\Delta}$$

time samples, comprising time samples representative of the channel and located in the interval CP/Δ and time samples representative of noise in the interval $$\frac{N/\delta - CP}{\Delta}.$$

During the feedback step 14 of sending back a return signal, there is no need to return the time samples representing noise to the transmitter. As a result, either the first CP/Δ time samples of the various partial responses (corresponding to the shaded portions of FIG. 4) are transmitted, or else only the time samples representative of the channel and located in the interval CP/Δ.

In a variant that is not shown, the transform step 13 performs a multiplication of each of the frequency sample vectors by a transfer matrix of size $$\frac{N/\delta}{\Delta} \times \frac{CP}{\Delta}$$

that has been extracted from an inverse Fourier matrix of size $$\frac{N/\delta}{\Delta} \times \frac{N/\delta}{\Delta}$$

in which only the CP/Δ first columns have been retained. The partial responses RT1 and RT2 of the channel in the time domain as obtained in this way then comprise time samples representative of the channel and located in the CP/Δ first samples. Once more, there are sent back to the transmitter from the partial responses RT1 and RT2 either the CP/Δ time samples or else only the time samples representative of the channel and located in the interval CP/Δ.

The operations performed at the transmitter end are identical to those described for Np equal to Nmod with similar sizes for matrices and vectors of time and/or frequency samples. Those operations are therefore not described again for the situation in which Np is less than Nmod.

B) Transform Using a DCT

Below, with reference to FIGS. 5A, 5B, and 6, there follows a description of a second implementation of the invention based on the use of a transform of the discrete cosine transform (DCT) type.

1. Np=Nmod

Figure 5A:
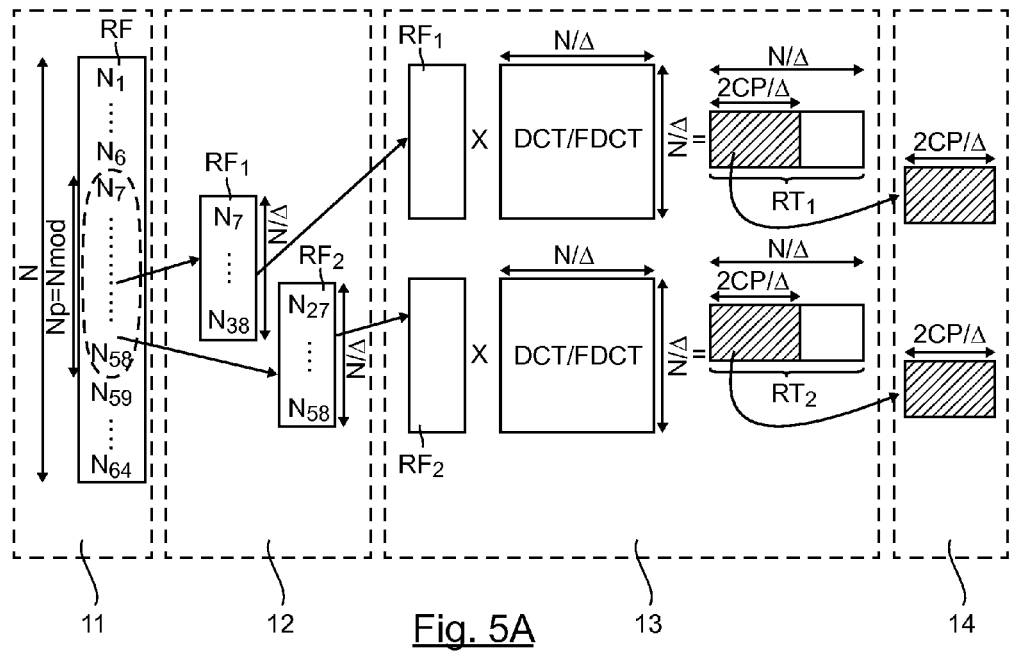
Figure 5B:
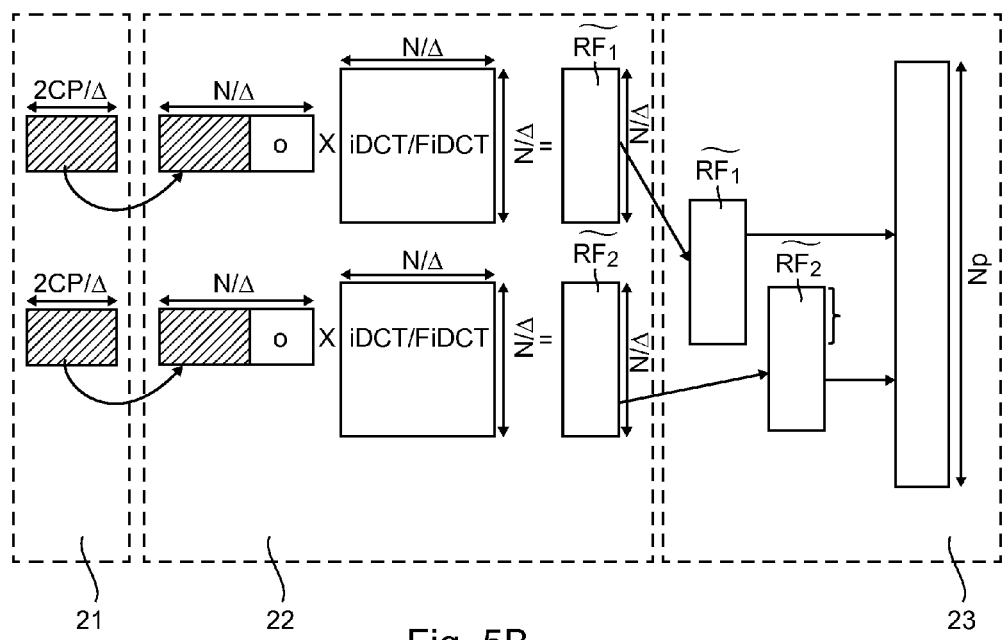

In this second implementation, it is likewise assumed that Np is equal to Nmod, as shown in FIGS. 5A and 5B. Furthermore, it is assumed that null carriers are inserted in the margins and/or in the middle of the spectrum of the multicarrier signal (Nmod<N).

By way of example, N is equal to 64, Nmod is equal to 52, and Δ is equal to 2.

The channel estimation step 11 and the sharing step 12 in this second implementation are similar to those described with reference to FIG. 3A and the first implementation. Consequently, they are not described in greater detail.

More precisely, the sharing step delivers two frequency sample vectors RF1 and RF2, each having 32 frequency samples (N7 to N38 for RF1 and N27 to N58 for NF2).

During the following transform step 13, a transfer function of the cosine transform type is applied to the frequency sample vectors RF1 and RF2, thereby obtaining from each frequency sample vector a partial response of the channel in the transform domain, these partial responses being written respectively RT1 and RT2. For example, one such transfer function is of the DCT type or of the fast DCT (FDCT) type.

Under such circumstances, each partial response comprises samples representative of the channel in the transform domain and located in an interval presenting a length (measured as a number of samples in the transform domain) that is less than or equal to 2CP/Δ.

As shown in FIG. 5A and by way of example, the transform step 13 performs multiplication of each of the frequency sample vectors by a transfer matrix representative of a cosine transform of the DCT or FDCT type and of size N/Δ×N/Δ. Each of the partial responses RT1 and RT2 of the channel in the transform domain as obtained in this way comprises N/Δ samples in the transform domain, made up of samples representative of the channel in the transform domain and located in the interval 2CP/Δ, and of samples representative of noise in the transform domain and in the interval (N−2CP)/Δ.

During the step 14 of sending back a return signal, there is no need to return the samples representative of noise in the transform domain to the transmitter. Therefore, either the first 2CP/Δ samples of the various partial responses in the transform domain (corresponding to the shaded portions in FIG. 5A) are sent back, or else only the samples representative of the channel in the transform domain and located in the interval 2CP/Δ.

In a variant that is not shown, the transform step 13 performs multiplication of each of the frequency sample vectors by a transfer matrix of size N/Δ×2CP/Δ that is extracted from a matrix representative of a cosine transform of size N/Δ×N/Δ, in which only the first 2CP/Δ columns are retained. The partial responses RT1 and RT2 of the channel in the transform domain as obtained in this way then comprise samples representative of the channel in the transform domain and located among the 2CP/Δ first samples. Once more, from the partial responses RT1 and RT2, there are sent back to the transmitter either the 2CP/Δ samples in the transform domain, or else only the samples representative of the channel in the transform domain and located in the interval 2CP/Δ.

As shown in FIG. 5B, at the transmitter end, the received return signal (21) comprises at least two sets of samples representative of the channel in the transform domain, each set being associated with a distinct partial response. Each set has 2CP/Δ samples in the transform domain, or else only those samples that are representative of the channel in the transform domain and located in the interval 2CP/D.

Those sets are then transformed from the transform domain to the frequency domain by using a transform that is the inverse of the transform that was used at the receiver end (inverse discrete cosine transform (iDCT) or inverse fast discrete cosine transform (iFDCT), for example).

More precisely, in the example shown in FIG. 5B, the transform step 22 performs the following steps, for at least one of the sets:
constructing a sample vector in the transform domain of size N/Δ, comprising said set (made up of 2CP/Δ samples in the transform domain, or of only the samples representative of the channel in the transform domain and located in the interval 2CP/Δ) plus null elements. In other words, the set is "built out" in the transform domain in order to obtain a sample of vectors in the transform domain that has N/Δ samples (32 in the example described), by adding null elements after the 2CP/Δ samples in the transform domain or after the samples that are representative of the channel in the transform domain and located in the interval 2CP/Δ; and
multiplying by a transfer matrix of size N/Δ×N/Δ (iDCT or iFDCT), thereby obtaining a frequency sample vector of size N/Δ.

This produces two frequency sample vector $\widetilde{RF1}$ and $\widetilde{RF2}$, each comprising N/Δ=32 frequency samples, corresponding to the frequency sample vectors RF1 and RF2 obtained at the receiver end.

During the following step 23 of recombination, the frequency sample vectors are recombined in order to obtain overall information about the channel in the frequency domain on Np frequency samples. This recombination step 23 is similar to that described with reference to FIG. 3B in the first implementation. Consequently, it is not described in further detail.

2. Nmod>Np

Figure 6:
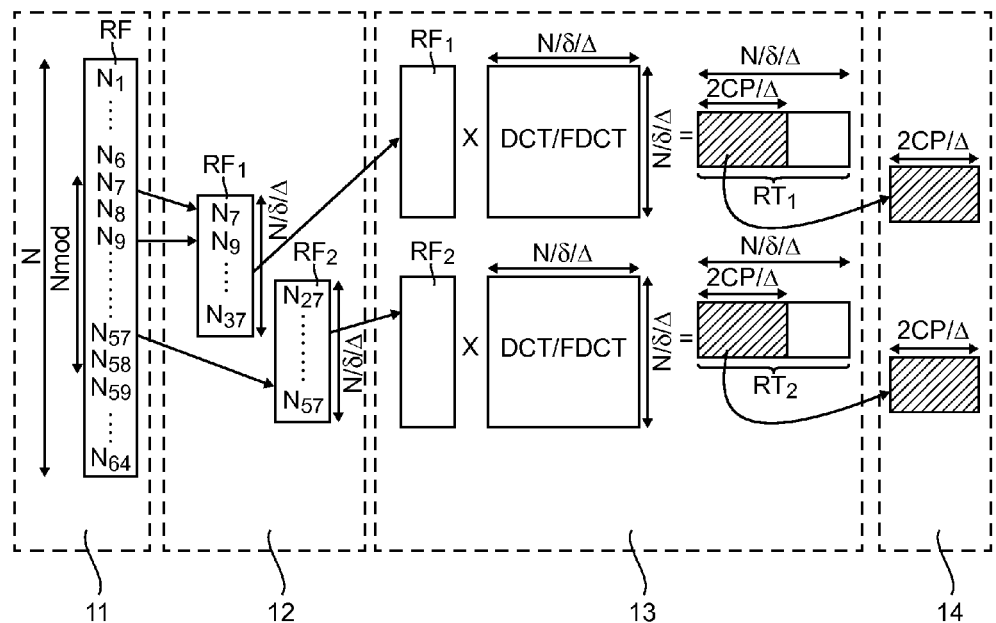

As in the first implementation, it is considered below that Np is less than Nmod, as shown in FIG. 6.

By way of example, it is assumed once more that N is equal to 64, Nmod is equal to 52, and the pilot repetition factor is equal to ½.

In this second implementation, the steps 11 and 12 of channel estimation and of sharing are similar to those described with reference to FIG. 4 in the first implementation. Consequently, they are not described in greater detail.

More precisely, the sharing step 12 delivers a first frequency sample vector RF1 comprising the samples corresponding to the positions of the first 16 pilots P dedicated to estimating the channel (corresponding to positions presenting odd indices N7, N9, N11, . . . , N35, N37), and a second frequency sample vector RF2 comprising the 16 samples corresponding to the positions of the last 16 pilots P dedicated to estimating the channel (corresponding to the positions presenting odd indices N27, N29, N31, . . . , N55, N57).

During a following transform step 13, a discrete cosine transform is applied to the frequency sample vectors RF1 and RF2, thereby obtaining from each frequency sample vector a respective partial response of the channel in the channel in the transform domain, the partial responses being written RT1 and RT2, respectively. By way of example, such a discrete cosine transform is of the DCT type or of the FDCT type.

Under such circumstances, each partial response comprises samples representative of the channel and located in the transform domain in an interval presenting a length (measured as a number of samples in the transform domain) that is less than or equal to 2CP/Δ.

As shown in FIG. 6 and by way of example, the transform step 13 performs a multiplication of each of the frequency sample vectors by a transfer matrix representative of a cosine transform of size $$\frac{N/\delta}{\Delta} \times \frac{N/\delta}{\Delta}.$$

Each of the partial responses RT1 and RT2 of the channel in the transform domain as obtained in this way comprises $$\frac{N/\delta}{\Delta}$$

samples in the transform domain, comprising samples representative of the channel in the transform domain and located in the interval 2CP/Δ and samples representative of noise in the transform domain in the interval $$\frac{N/\delta - 2CP}{\Delta}.$$

During the step 14 of sending back a return signal, there is no need to return the samples representative of noise in the transform domain to the transmitter. As a result there are sent back either only the first 2CP/Δ samples of the various partial responses in the transform domain (corresponding to the shaded portions in FIG. 6), or else only the samples representative of the channel in the transform domain and located in the interval 2CP/Δ.

In a variant that is not shown, the transform step 13 performs multiplication of each of the frequency sample vectors by a transfer matrix of size $$\frac{N/\delta}{\Delta} \times \frac{2CP}{\Delta}$$

extracted from a matrix representative of a cosine transform and of size $$\frac{N/\delta}{\Delta} \times \frac{N/\delta}{\Delta}$$

from which only the first 2CP/Δ columns have been retained. The partial responses RT1 and RT2 of the channel in the transform domain, as obtained in this way, then comprise samples representative of the channel in the transform domain and located in the first 2CP/Δ samples. Once more, from the partial responses RT1 and RT2, there are sent back to the transmitter either the 2CP/Δ samples in the transform domain, or else only the samples representative of the channel in the transform domain and located in the interval 2CP/Δ.

The operations performed at the transmitter end are identical to those performed for the situation in which Np is equal to Nmod, with matrix and sample vector sizes in the transform domain and/or in the frequency domain that are similar. They are therefore not described again for the situation in which Np is less than Nmod.

5.4 Optimizing Transfer Functions

Two other implementations of the invention are described below implementing firstly an optimized Fourier transform and secondly an optimized transform of the DCT type, in the transform steps performed between the frequency domain and a transform domain.

Under certain circumstances, directly applying a conventional transfer function (Fourier, DCT, DST, etc. transform) to a subband of the channel does not make it possible to locate the samples that are representative of the channel in the transform domain of the various partial responses within an interval presenting a length that is less than or equal to CP/$\Delta$ or 2CP/$\Delta$. In other words, it can happen that the transform step 13 delivers partial responses comprising samples representative of the channel in the transform domain that are mixed with samples representative of noise in the transform domain.

This may be due to the presence of null carriers in the margins and/or in the middle of the spectrum of the multicarrier signal, where such carriers are inserted in particular in order to avoid spectrum overlap with other applications using adjacent frequency bands. The existence of these null carriers gives rise to edge effects in the response of the channel, known specifically as "aliasing", that can become highly dispersive in the transform domain and therefore difficult to locate.

In this situation, it may be necessary to determine a specific transfer matrix making it possible to be unaffected by the carriers that are modulated by a null value and that are located at the margins and/or at the center of the spectrum of the multicarrier signal, and/or by the carriers that are modulated by useful (payload) data, and/or by the carriers that are modulated by pilots dedicated to estimating some other transmission channel, if such carriers exist.

During the transform step 13, such a specific transfer matrix makes it possible to concentrate the samples representative of the channel in the transform domain in the first CP/$\Delta$ or 2CP/$\Delta$ samples of the channel response in the transform domain.

The French patent applications FR 10/53696 filed on May 11, 2010, and FR 10/58431 filed on Oct. 15, 2010 describe more completely that technique of constructing a specific transfer matrix.

A) Transform Using an Optimized Fourier Transform

Figure 7:
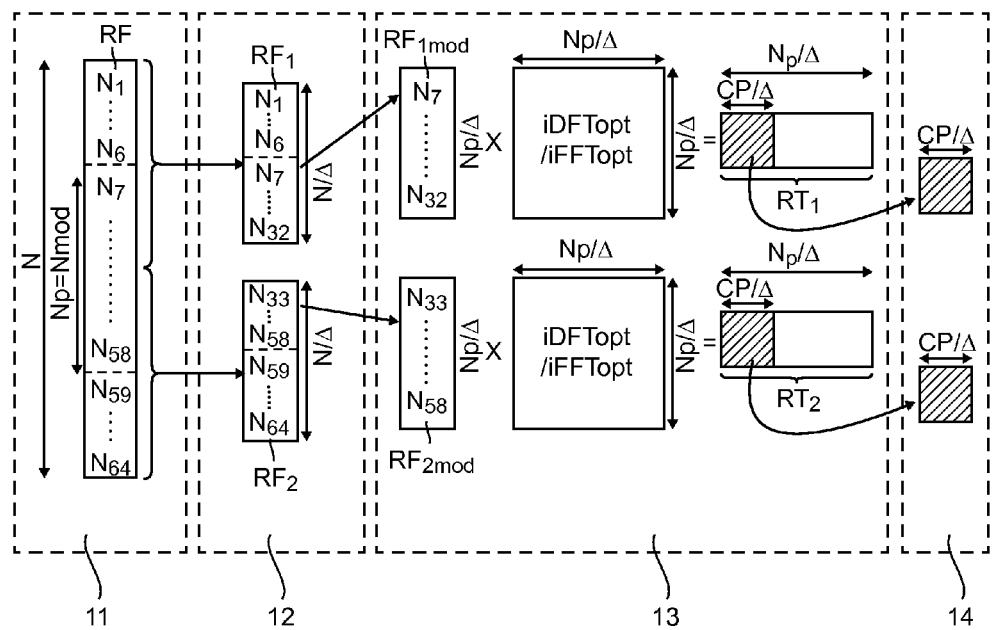
FIGS. 7 and 8 show a third implementation performing an optimized Fourier transform type transfer function for Np=Nmod (FIG. 7) or for Np<Nmod (FIG. 8)

With reference to FIGS. 6 and 7, there follows a description of a third implementation of the invention based on using a specific transfer matrix constructed from a Fourier matrix.

Figure 8:
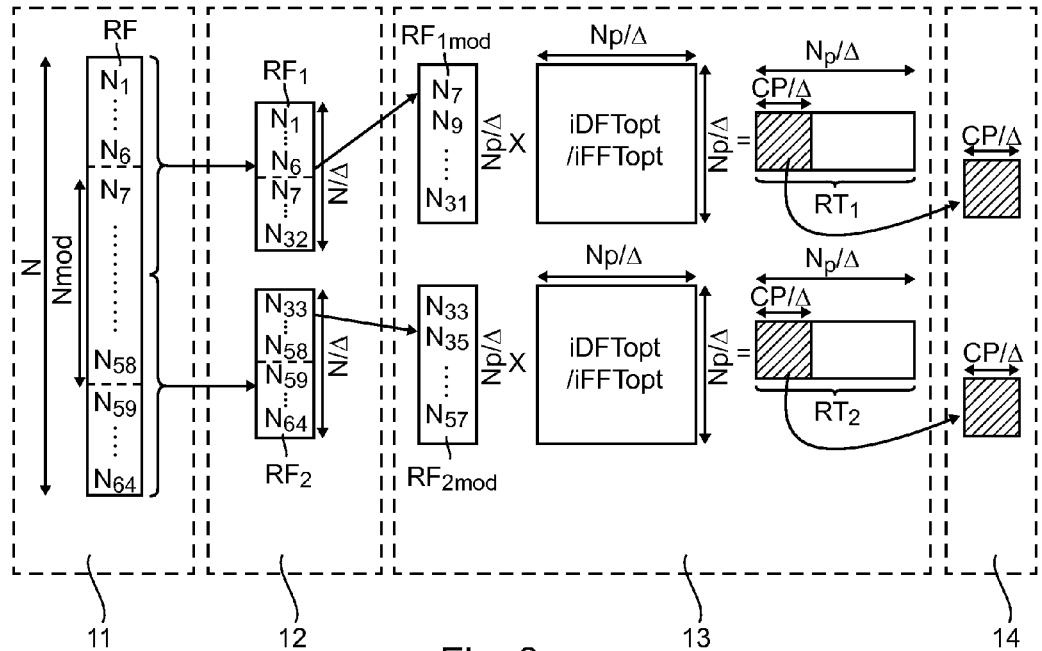

As in the first and second implementations, two situations are distinguished, the situation where Np is equal to Nmod (shown in FIG. 7), and the situation in which Np is less than Nmod (shown in FIG. 8).

1. Np=Nmod

By way of example, it is assumed once more than N is equal to 64 and Nmod is equal to 52.

As shown in FIG. 7, at the receiver end, the frequency response RF of the transmission channel as obtained at the end of the estimation step 11 in its sampled form comprises N frequency samples written N1, N2, . . . , N64.

In this third implementation, the sharing step 12 shares over frequency sample vectors all of the N frequency samples N1, N2, . . . , N64 of a multicarrier symbol, which samples thus correspond to the positions of carriers modulated by a null value (N−Nmod=12, corresponding to the frequency samples N1 to N6 and N59 to N64) or a non-null value (Nmod=52, corresponding to the frequency samples N7 to N58). In this implementation, $\Delta$ frequency sample vectors are obtained, each comprising N/$\Delta$ frequency samples. Thus, unlike the first two implementations based on using a conventional transfer function, the various frequency sample vectors in this example do not overlap.

In the example shown in FIG. 7, $\Delta$ is equal to 2. Each frequency sample vector thus comprises N/$\Delta$=32 frequency samples, the first frequency sample vector RF1 comprising the samples corresponding to the positions of the first 32 carriers modulated by a null or non-null value (corresponding to positions N1 to $N_{N/2}$, i.e. N1 to N32) and a second frequency sample vector RF2 comprising the samples corresponding to the positions of the last 32 carriers modulated by a null value or a non-null value (corresponding to the positions $N_{N/2+1}$ to $N_N$, i.e. N33 to N64). The two frequency sample vectors RF1 and RF2 therefore do not overlap.

Prior to the transform step 13, the two frequency sample vectors are modified so as to eliminate the frequency samples that correspond to the positions of the null carriers.

This produces a first modified vector written RF1mod comprising solely the frequency samples N7 to N32, and a second modified vector, written RF2mod, comprising solely the frequency samples N33 to N58. The modified vectors therefore comprise only the frequency samples corresponding to the positions of carriers modulated by pilots dedicated to estimating the transmission channel.

During a following transform step 13, an optimized transfer function is applied to the modified vectors RF1mod and RF2mod, thereby delivering, for each modified vector, a partial response of the channel in the time domain, the partial responses being written RT1 and RT2 respectively. Each resulting partial response then comprises time samples representative of the channel located in an interval presenting a length (measured as a number of time samples) that is less than or equal to CP/$\Delta$.

As shown in FIG. 7 and by way of example, the transform step 13 may perform multiplication of the modified vectors by specific transfer matrices that are constructed while taking account of the positions of the carriers modulated by pilots for estimating the transmission channel. In other words, a specific transfer matrix serves to ignore carriers modulated by a null value and located at the margins and/or at the center of the spectrum of the multicarrier signal, and/or to ignore carriers modulated by useful data, and/or to ignore carriers modulated by pilots dedicated to estimating some other transmission channel, if such carriers exist. The transfer matrices used for transforming the various modified vectors are therefore not necessarily identical.

More precisely, a specific transfer matrix is constructed by performing the following substeps:
- obtaining a reduced matrix that is extracted from a Fourier matrix of size N/$\Delta$×N/$\Delta$, within which the elements corresponding to the positions of the carriers of the pilot symbol that are modulated by pilots dedicated to estimating the transmission channel are retained;
- decomposing the reduced matrix into eigenvalues; and
- determining the transfer matrix on the basis of a set of eigenvalues selected from among the eigenvalues.

In the example shown in FIG. 7, the reduced matrix used for constructing the transfer matrix for converting the first modified vector RF1mod from the frequency domain to the time domain, written $F_{Np/\Delta}^1$, is obtained by eliminating the first six rows from a Fourier matrix of size (N/$\Delta$×N/$\Delta$)=(32× 32) corresponding to the positions of null carriers (corresponding to frequency samples N1 to N6). The reduced matrix used for constructing the transfer matrix for converting the second modified vector RF2mod from the frequency domain to the time domain, written $F_{Np/\Delta}^2$, is obtained by eliminating the last six rows from a Fourier matrix of size ($N/\Delta \times N/\Delta$)=(32×32), corresponding to the positions of null carriers (corresponding to frequency samples N59 to N64).

The resulting reduced matrices are of size ($Np/\Delta \times N/\Delta$)= (26×32).

The various reduced matrices $F_{Np/\Delta}^1$ and $F_{Np/\Delta}^2$ are decomposed into eigenvalues, and for each modified vector, a distinct transfer matrix is determined from a set of eigenvalues selected from the eigenvalues obtained for the reduced matrices $F_{Np/\Delta}^1$ and $F_{Np/\Delta}^2$, as described in the French patent applications FR 10/53696 filed on May 11, 2010 and FR 10/58431 filed on Oct. 15, 2010. The resulting transfer matrices present a size ($Np/\Delta \times Np/\Delta$).

It should be recalled that the technique of constructing a transfer matrix as described in the above-mentioned patent applications makes it possible to determine an "overall" transfer matrix suitable for transforming the "overall" response of the channel from the frequency domain to a transform domain.

In this example, since it involves working on partial responses (subbands of the channel), a plurality of "partial" transfer matrices are determined, each serving to transform a portion of the response of the channel from the frequency domain to a transform domain. Work is thus performed "block by block", and, in comparison with the above-mentioned patent applications, all of the matrix sizes are divided by the number of frequency sample vectors.

Each of the partial responses of the channel in the time domain, obtained after multiplying the first modified vector RF1mod by the transfer matrix obtained from the reduced matrix $F_{Np/\Delta}^1$ and multiplying the second modified vector RF2mod by the transfer matrix obtained from the reduced matrix $F_{Np/\Delta}^2$, comprises $Np/\Delta$ time samples, comprising time samples representative of the channel and located in the interval $CP/\Delta$ and time samples representative of noise in the interval $(Np-CP)/\Delta$, with $Np<CP$.

As in the first and second implementations, during the step 14 of transmitting a return signal, there is no need to return the time samples representing noise to the transmitter. There are thus transmitted either the first $CP/\Delta$ time samples of the various partial responses (corresponding to the shaded portions in FIG. 7), or else only the time samples representative of the channel and located in the interval $CP/\Delta$.

In a variant that is not shown, the transform step 13 performs multiplication of the modified vectors by transfer matrices, each obtained from a reduced matrix, itself obtained by eliminating the rows of a Fourier matrix of size ($N/\Delta \times N/\Delta$)=(32×32) that correspond to the positions of the null carriers, while conserving only the first $CP/\Delta$ columns. The reduced matrices as obtained in this way, written $F_{CP/\Delta}^1$ and $F_{CP/\Delta}^2$ thus present a size of ($Np/\Delta \times CP/\Delta$). The resulting partial responses RT1 and RT2 of the channel in the time domain comprise time samples representative of the channel and located in the first $CP/\Delta$ samples. Once more, from the partial responses RT1 and RT2, there are sent back to the transmitter either the $CP/\Delta$ time samples, or else only the time samples representative of the channel and located in the interval $CP/\Delta$.

The operations performed at the transmitter end are identical to those described for the first implementation with reference to FIG. 3B. They are therefore not described again.

2. Nmod>Np

It is assumed below that Nmod is greater than Np, as shown in FIG. 8. By way of example, the pilots dedicated to estimating the transmission channel are shared over a pilot symbol in a regular pattern.

By way of example, it is assumed once more than N is equal to 64, Nmod is equal to 52, and that the repetition factor of the pilots is equal to ½. This gives Np equal to 26. In this example, a pilot symbol comprises an alternation of pilots dedicated to estimating the transmission channel and written P, and useful data or pilots dedicated to estimating another transmission channel and written D.

As shown in FIG. 8, at the receiver end, the frequency response RF of the transmission channel obtained at the end of the estimation step 11 in its sampled form comprises N frequency samples, written N1, N2, . . . , N64.

Of these N=64 frequency samples, the first six (N1 to N6) and the last six (N59 to N64) correspond to the positions of carriers modulated by a null value of a multicarrier symbol of the signal. The Nmod=52 remaining samples correspond to positions of carriers modulated by a non-null value of the multicarrier symbol (P or D). By way of example, among these 52 remaining frequency samples, the frequency samples of odd index (N7, N9, N11, . . . , N57) correspond to pilots P, and the frequency samples of even index (N8, N10, N12, . . . , N58) correspond to useful data D.

In this third implementation, as described for the situation in which Nmod=Np, the sharing step 12 shares among the frequency sample vectors all of the N frequency samples N1, N2, . . . , N64. This produces $\Delta$ frequency sample vectors, each comprising $N/\Delta$ frequency samples that do not overlap. More precisely, the sharing step delivers two frequency sample vectors RF1 and RF2, each comprising 32 frequency samples (N1 to N32 for RF1, and N33 to N64 for RF2).

Prior to the transform step 13, the two frequency sample vectors are modified in order to eliminate the frequency samples that correspond to the positions of null carriers, to useful data, and to pilots dedicated to estimating some other transmission channel.

This produces a first modified vector written RF1mod that comprises only the frequency samples of odd index N7 to N31, and a second modified vector, written RF2mod, that comprises only the frequency samples of odd index N33 to N57. The modified vectors thus comprise only frequency samples that correspond to positions of the carriers that are modulated by pilots dedicated to estimating the transmission channel.

During a following transform step 13, an optimized transfer function is applied to the modified vectors RF1mod and RF2mod, thereby obtaining, for each modified vector, respective partial responses of the channel in the time domain, the partial responses being written RT1 and RT2, respectively. Each partial response that is obtained then comprises time samples representative of the channel and located in an interval presenting a length that is less than or equal to $CP/\Delta$.

As shown in FIG. 8 and by way of example, the transform step 13 performs multiplication of each of the modified vectors by a specific transfer matrix that is constructed as described above for the situation in which Nmod=Np in this third implementation.

More precisely, the reduced matrix used for constructing the transfer matrix that enables the first modified vector RF1mod to be converted from the frequency domain to the time domain, written $F_{Np/\Delta}^1$, is obtained by eliminating the first six rows and the rows of odd index from a Fourier matrix of size ($N/\Delta \times N/\Delta$)=(32×32), corresponding to the positions of the null carriers (corresponding to the frequency samples N1 to N6) and to the carriers modulated by useful data or by pilots dedicated to estimating some other channel (corresponding to the frequency samples of even index N6, N8, . . . , N30, N32). The reduced matrix used for constructing the transfer matrix that serves to convert the second modified vector RF2mod from the frequency domain to the time domain, written $F_{Np/\Delta}^2$, is obtained by eliminating the rows of even index and the last six rows from a Fourier matrix of size $(N/\Delta \times N/\Delta)=(32\times32)$, corresponding to the positions of the null carriers (corresponding to the frequency samples N59 to N64), and carriers modulated by useful data or by pilots dedicated to estimating some other channel (corresponding to the frequency samples of even index N34, N36, ..., N58).

The various reduced matrices $F_{Np/\Delta}^1$ and $F_{Np/\Delta}^2$ are decomposed into eigenvalues, and for each modified vector, a distinct transfer matrix is determined from a set of eigenvalues selected from the eigenvalues obtained for the reduced matrices $F_{Np/\Delta}^1$ and $F_{Np/\Delta}^2$.

Each of the partial responses of the channel in the time domain, as obtained after multiplying the first modified vector RF1mod by the transfer matrix obtained from the reduced matrix $F_{Np/\Delta}^1$ and multiplying the second modified vector RF2mod by the transfer matrix obtained from the reduced matrix $F_{Np/\Delta}^2$ comprises $Np/\Delta$ time samples, comprising time samples representative of the channel and located in the interval $CP/\Delta$ and time samples representative of noise in the interval $(Np-CP)/\Delta$, with $Np>CP$.

As for the situation in which Np=Nmod in this third implementation, the feedback step 14 of sending back a return signal involves sending either the first $CP/\Delta$ time samples of the various partial responses (corresponding to the shaded portions of FIG. 8), or else only the time samples representative of the channel and located in the interval $CP/\Delta$.

In a variant that is not shown, the transform step 13 performs multiplication of the modified values by transfer matrices that are each obtained from a reduced matrix, itself obtained by eliminating the rows of a Fourier matrix of size $(N/\Delta \times N/\Delta)=(32\times32)$ that correspond to the positions of null carriers, of useful data, and of pilots dedicated to estimating some other channel, and while retaining only the first $CP/\Delta$ columns. The reduced matrices as obtained in this way, written $F_{Np/\Delta}^1$ and $F_{CP/\Delta}^2$ thus present a size $(Np/\Delta \times CP/\Delta)$. As for the situation in which Np=Nmod, the partial responses RT1 and RT2 of the channel in the time domain as obtained in this way comprise time samples representative of the channel and located in the first $CP/\Delta$ time samples.

The operations performed at the transmitter end are identical to those described for the first implementation with reference to FIG. 3B. They are therefore not described again.

B) Transform Using a Transform of the Optimized DCT Type

With reference to FIG. 8, there follows a description of a fourth implementation of the invention, based on using a specific transfer matrix constructed from a matrix representative of a cosine transform.

As for the three above-described implementations, two situations are distinguished: Nmod is equal to Np (shown in FIG. 8), and Np is less than Nmod.

1. Np=Nmod

In this fourth implementation, it is likewise assumed that N is equal to 64, Nmod is equal to 52, and $\Delta$ is equal to 2.

The steps 11 and 12 of estimating the channel and of sharing in this fourth implementation are similar to those described with reference to FIG. 7 and the third implementation. Consequently, they are not described in greater detail.

More precisely, the sharing step delivers two frequency sample vectors RF1 and RF2 each comprising 32 frequency samples (N1 to N32 for RF1, and N33 to N64 for RF2).

As described with reference to the third implementation, before the transform step 13, the two frequency sample vectors are modified in order to eliminate the frequency samples that correspond to the positions of null carriers. This produces a first modified vector written RF1mod having only the frequency samples N7 to N32, and a second modified vector, written RF2mod, comprising only the frequency samples N33 to N58. The modified vectors thus comprise only the frequency samples that correspond to the positions of carriers modulated by pilots dedicated to estimating the transmission channel.

During a following transform step 13, an optimized transfer function is applied to each modified value RF1mod and RF2mod, delivering, for each modified vector, a respective partial response of the channel in the transform domain, the partial responses being written RT1 and RT2, respectively. Each resulting partial response comprises samples representative of the channel in the transform domain and located in an interval presenting a length (measured as a number of samples in the transform domain) that is less than or equal to $2CP/\Delta$.

Figure 9:
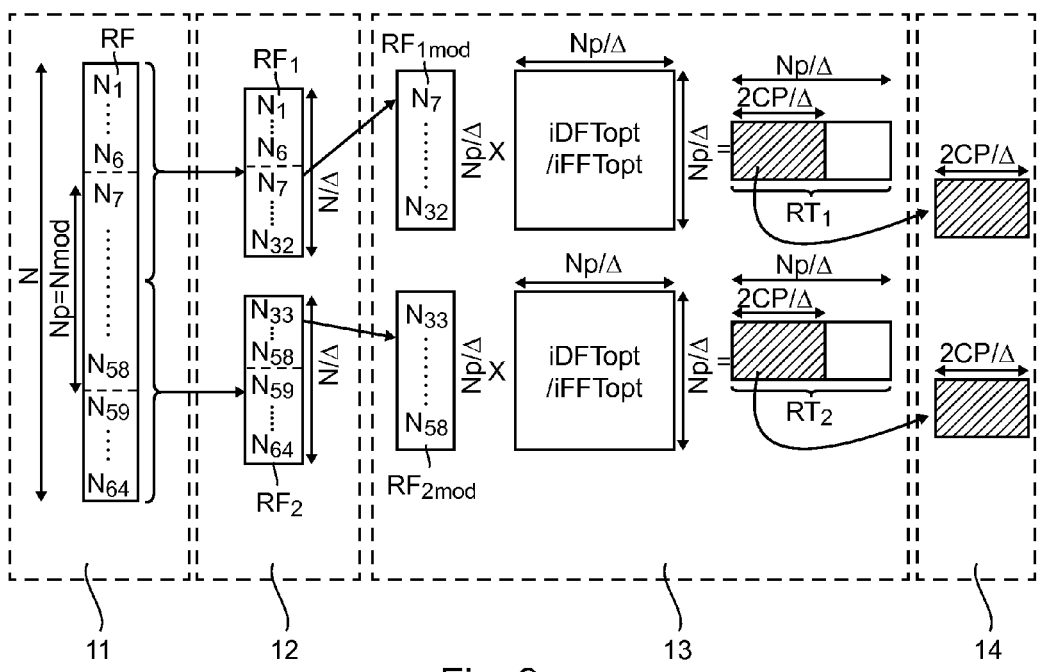
FIG. 9 shows a fourth implementation performing an optimized cosine transform type transfer function for Np=Nmod.

As shown in FIG. 9 and by way of example, the transform step 13 performs multiplication of the modified vectors by specific transfer matrices that are constructed while taking account of the positions of the carriers that are modulated by pilots dedicated to estimating the transmission channel.

More precisely, a specific transfer matrix is constructed by implementing the following substeps:
obtaining a reduced matrix that is extracted from a matrix representative of a cosine transform of size $N/\Delta \times N/\Delta$ within which the elements corresponding to the positions of the carriers of the pilot symbol that are modulated by pilots dedicated to estimating the transmission channel are retained;
decomposing the reduced matrix into eigenvalues; and
determining the transfer matrix from a set of eigenvalues selected from the eigenvalue.

In the example shown in FIG. 9, the reduced matrix used for constructing the transfer matrix that serves to convert the first modified vector RF1mod from the frequency domain to the transform domain, written $F_{Np/\Delta}^1$, is obtained by eliminating the first six rows of a matrix representative of a cosine transform of size $(N/\Delta \times N/\Delta)=(32\times32)$ and corresponding to the positions of null carriers (corresponding to the frequency samples N1 to N6). The reduced matrix used for constructing the transfer matrix that serves to convert the second modified vector RF2mod from the frequency domain to the transform domain, written $F_{Np/\Delta}^2$, is obtained by eliminating the last six rows of a matrix representative of a cosine transform of size $(N/\Delta \times N/\Delta)=(32\times32)$, and corresponding to the positions of null carriers (corresponding to the frequency samples N59 to N64). The reduced matrices are thus of size $(Np/\Delta \times N/\Delta)=(26\times32)$.

The various reduced matrices $F_{Np/\Delta}^1$ and $F_{Np/\Delta}^2$ are decomposed into eigenvalues, and for each modified vector, a distinct transfer matrix is determined from a set of eigenvalues selected from the eigenvalues obtained for the reduced matrices $F_{Np/\Delta}^1$ and $F_{Np/\Delta}^2$.

Each of the partial responses of the channel in the transform domain, obtained after multiplying the first modified vector RF1mod by the transfer matrix obtained from the reduced matrix $F_{Np/\Delta}^1$ and by multiplying the second modified vector RF2mod by the transfer matrix obtained from the reduced matrix $F_{Np/\Delta}^2$ comprises $Np/\Delta$ samples in the transform domain, comprising samples representative of the channel in the transform domain and located in the interval $2CP/\Delta$ and samples representative of noise in the transform domain in the interval $(Np-2CP)/\Delta$, with $Np>2CP$.

As in the three above-described implementations, during the step 14 of transmitting a return signal, there is no need to return to the transmitter the samples that are representative of noise in the transform domain. There are thus transmitted either the first $2CP/\Delta$ samples of the various partial responses in the transform domain (corresponding to the shaded portions in FIG. 9), or else only the samples representative of the channel in the transform domain and located in the interval 2CP/Δ.

In a variant that is not shown, the transform step 13 performs multiplication of the modified vectors by transfer matrices, each obtained from a reduced matrix, itself obtained by eliminating the rows from a matrix representative of a cosine transform of size (N/Δ×N/Δ)=(32×32) corresponding to the positions of null carriers, and retaining only the first 2CP/Δ columns. The reduced matrices as obtained in this way, and written $F_{Np/\Delta}^1$ and $F_{2CP/\Delta}^2$ are thus of size (Np/Δ× 2CP/Δ). The partial responses RT1 and RT2 of the channel in the transform domain as obtained in this way thus comprise samples representative of the channel in the transform domain and located in the first 2CP/Δ samples in the transform domain. Once more, from the partial responses RT1 and RT2, there are sent back to the transmitter either the 2CP/Δ samples in the transform domain, or else only the samples representative of the channel in the transform domain and located in the interval 2CP/Δ.

The operations performed at the transmitter end are identical to those described for the second implementation, with reference to FIG. 5B. They are therefore not described again.

2. Np<Nmod

It is assumed below that Nmod is less than Np. It is also assumed once more, and by way of example, that N is equal to 64, Nmod is equal to 52, and the repetition factor of the pilots is equal to ½. This gives Np equal to 26.

In this fourth implementation, the steps 11 and 12 of estimating the channel and of sharing are similar to those described with reference to FIG. 8 in the third implementation. Consequently, they are not described in greater detail.

More precisely, the sharing step delivers two frequency sample vectors RT1 and RF2, each comprising 32 frequency samples (N1 to N32 for RF1, and N33 to N64 for RF2).

Before the transform step 13, the two frequency sample vectors are modified in order to eliminate the frequency samples that correspond to the positions of null carriers, of useful data, and of pilots dedicated to estimating some other transmission channel.

As described with reference to FIG. 8 and the third implementation, this produces a first modified vector written RF1mod that comprises only the frequency samples of odd index N7 to N31, and a second modified vector, written RF2mod, that comprises only the frequency samples of odd index N33 to N57.

During a following transform step 13, an optimized transfer function is applied to each modified vector RF1mod and RF2mod, producing for each modified vector a respective partial response of the channel in the transform domain, the partial responses being written RT1 and RT2, respectively. Each resulting partial response then comprises samples representative of the channel in the transform domain and located in an interval presenting a length (measured as a number of samples in the transform domain) that is less than or equal to 2CP/Δ.

As shown in FIG. 9 and by way of example, the transform step 13 performs multiplication of each of the modified vectors by a specific transfer vector that is constructed as described above for the situation in which Nmod=Np in this fourth implementation.

More precisely, the reduced matrix that is used for constructing the transfer matrix and that serves to convert the first modified vector RF1mod from the frequency domain to the transform domain, is written $F_{Np/\Delta}^1$, and it is obtained by eliminating the first six rows and the rows of even index from a matrix representative of a cosine transform of size (N/Δ×N/Δ)=(32×32), corresponding to the positions of null carriers (corresponding to the frequency samples N1 to N6), and of carriers modulated by useful data or by pilots dedicated to estimating some other channel (corresponding to the frequency samples of even index N6, N8, . . . , N30, N32). The reduced matrix that is used for constructing the transfer matrix and that serves to convert the second modified vector RF2mod from the frequency domain to the transform domain, is written $F_{Np/\Delta}^2$, and it is obtained by eliminating rows of even index and the last six rows of a matrix representative of a cosine transform and of size (N/Δ×N/Δ)=(32×32), corresponding to the positions of null carriers (corresponding to frequency samples N59 to N64) and to carriers modulated by useful data or by pilots dedicated to estimating some other channel (corresponding to frequency samples of even index N34, N36, . . . , N58). The reduced matrices present a size (Np/Δ×N/Δ)=(13×32).

The various reduced matrices $F_{Np/\Delta}^1$ and $F_{Np/\Delta}^2$ are decomposed into eigenvalues, and for each modified vector, a distinct transfer matrix is determined from a set of eigenvalues selected from the eigenvalues obtained for the reduce matrices $F_{Np/\Delta}^1$ and $F_{Np/\Delta}^2$.

Each of the partial responses of the channel in the transform domain, obtained after multiplying the first modified vector RF1mod by the transfer matrix obtained from the reduced matrix $F_{Np/\Delta}^1$ and by multiplying the second modified vector RF2mod by the transfer matrix obtained from the reduced matrix $F_{Np/\Delta}^2$ comprises Np/Δ samples in the transform domain, comprising samples representative of the channel in the transform domain located in the interval 2CP/Δ and samples representative of noise in the transform domain in the interval (Np−2CP)/Δ, with Np>2CP.

As when Np=Nmod, in this fourth implementation, in the feedback step 14, a return signal is sent back comprising either the first 2CP/Δ samples of the various partial responses in the transform domain (corresponding to the shaded portions in FIG. 9), or else only the samples representative of the channel in the transform domain and located in the interval 2CP/Δ.

In a variant that is not shown, the transform step 13 performs multiplication of the modified vectors by transfer matrices, each obtained from a reduced matrix, itself obtained by eliminating the rows of a matrix representative of a cosine transform of size (N/Δ×N/Δ)=(32×32), corresponding to the positions of null carriers, of useful data, and of pilots dedicated to estimating some other channel, while conserving only the first CP/Δ columns. The reduced matrices as obtained in this way, written $F_{Np/\Delta}^1$ and $F_{Np/\Delta}^2$, thus present a size (Np/Δ×CP/Δ). As for when Np=Nmod, the partial responses RT1 and RT2 of the channel in the transform domain as obtained in this way then comprise samples representative of the channel in the transform domain, and located in the first 2CP/Δ samples.

The operations performed at the transmitter end are identical to those described for the second implementation with reference to FIG. 5B. They are therefore not described again.

5.5 Other Implementations

In the four implementations described above, consideration has been given to transfer functions of the Fourier transform type or of the cosine transform type. Naturally, other transfer functions could be envisaged, such as sine transforms or wavelet transforms, in conventional form or in optimized form.

Furthermore, in the four implementations described above, consideration has been given to a number N of carriers of a multicarrier symbol that is equal to 64. The invention is naturally not limited to that value, and N may be equal to 128, 256, etc., depending on the type of modulation used. When N is equal to 128, Nmod is equal to 108; when N is equal to 256, Nmod is equal to 234, etc.

Likewise, the number of time sample vectors obtained during the sharing step is not necessarily equal to 2. This number is preferably a power of 2. Thus, $\Delta$ may be equal to 4, 8, 16, etc.

If a "conventional" transfer function is used (first and second implementations), then the sample vectors overlap, since Np (or Np/δ if δ is not equal to 1) frequency samples are shared over $\Delta$ frequency sample vectors of size N/$\Delta$ (or of size N/δ/$\Delta$).

Thus, if $\Delta$=4, N=64, and Np=52, the first frequency sample vector has the samples N7 to N22, the second frequency sample vector has the samples N19 to N34, the third frequency sample vector has the samples N31 to N46, and the fourth frequency sample vector has the samples N43 to N58. The various frequency sample vectors thus overlap over $$\frac{N-Np}{\Delta-1}=4$$

frequency samples (samples N19 to N22 between the first and second frequency sample vectors, samples N31 to N34 between the second and third frequency sample vectors, and samples N43 to N46 between the third and fourth frequency sample vectors).

Thus, in general, it is possible to define the samples contained in a frequency sample vector, and also which samples overlap.

For example, when Np=Nmod, a vector i of frequency samples comprises the samples:

$$N_{\frac{N-Nmod}{2}+\frac{iN}{\Delta}+1} \text{ to } N_{\frac{N-Nmod}{2}+\frac{(i+1)N}{\Delta}}$$

with $0 \leq i < \Delta$. There is thus overlap between the vector i and the vector i+1, for the samples:

$$N_{\frac{N-Nmod}{2}+\frac{(i+1)N}{\Delta}-\frac{N-Np}{2(\Delta-1)}} \text{ to } N_{\frac{N-Nmod}{2}+\frac{(i+1)N}{\Delta}+\frac{N-Np}{2(\Delta-1)}}$$

If an "optimized" transfer function is used (third and fourth implementations), the sample vectors do not overlap, since the N frequency samples are shared over $\Delta$ frequency sample vectors of size N/$\Delta$.

Thus, if $\Delta$=4, N=64 and Np=52, the first frequency sample vector has the samples N1 to N16, the second frequency sample vector has the samples N17 to N32, the third frequency sample vector has the samples N33 to N48, and the fourth frequency sample vector has the samples N49 to N64.

Finally, if it is desired to further reduce the amount of information to be relayed to the transmitter, it is possible to reduce the noise that affects the first CP/$\Delta$ or the first 2CP/$\Delta$ samples of at least one partial response in the transform domain prior to the step of sending the signal back to the transmitter, by making use of the optional noise reduction algorithm described in the French patent applications FR 10/53696 filed on May 11, 2010, and FR 10/58431 filed on Oct. 15, 2010.

5.6 Performance

The technique proposed in the invention presents numerous advantages.

Firstly, it provides an improvement in terms of performance over prior art techniques by feeding back information on the transmission channel that is of better quality. In the invention, feedback is used to return partial responses of the channel in the transform domain as obtained from a plurality of groups of carriers of a pilot symbol (i.e. a plurality of subbands), and not an overall response obtained from all of the non-null carriers of a pilot symbol.

Thus, if consideration is given to frequency sample vectors, each comprising N/$\Delta$ successive frequency samples selected from the Np frequency samples obtained by estimating the channel (corresponding to the positions of Np pilots dedicated to estimating the channel), then a channel is found in the transform domain in which the useful energy is concentrated in the first 2CP/$\Delta$ samples (or the first CP/$\Delta$ samples in the time domain).

This technique thus makes it possible to reduce noise power and provides a performance improvement over known techniques relying on feedback transmission of information about the channel, and in particular relative to techniques that rely on feedback transmission of information about the channel in a transform domain and not in the frequency domain.

Thus, compared with the feedback transmission technique that uses a cosine channel on the overall frequency response of the channel, the invention averages noise power over N samples in the transform domain $$\left(\Delta \times \frac{N}{\Delta}\right),$$

and not over Np samples in the transform domain, and no more than $\Delta \times 2CP/\Delta$ samples are returned to the transmitter in the transform domain. The saving or "gain" in terms of noise is thus $10 \log(N/Np)$, regardless of the type of transfer function used.

It should be observed that this gain depends on the parameters of the communications system, and in particular on the number of null carriers. It should be recalled that in present communications systems there are always some carriers modulated by a null value (also referred to as non-modulated carriers) at the margins of the spectrum for the purpose of avoiding interference with systems occupying adjacent bands.

By way of example, this gain is 0.9 decibels (dB) for the 802.11n standard (WiFi standard with N=64 and Np=Nmod=52), and it may be increased up to 2.31 dB for a system of the 3GPP-LTE type (the mobile network standard with N=1024 and Np=Nmod=600).

Secondly, the invention makes it possible to reduce the complexity of known techniques that rely on feedback transmission of information about the channel, and in particular on techniques that rely on feedback transmission of overall information about the channel in a transform domain, rather than in the frequency domain.

More precisely, the invention makes it possible to reduce considerably the complexity of determining information about the channel in the transform domain without degrading performance, by taking different values of $\Delta$ into consideration.

Thus, whereas the technique relying on feedback transmission of an overall response about the channel in a transform domain (using DCT) requires the use of $Np^2$ multiplication operations and Np(Np−1) addition operations, the technique of the invention relying on transmitting samples extracted from partial responses of the channel in the transform domain (using DCT) requires the use of only $(N/2\Delta)\log_2(N/\Delta)$ multiplication operations and only $(3N/2\Delta)\log_2(N/\Delta)-N+1$ addition operations.

By way of example, feedback transmission of an overall response about the channel in a DCT transform domain requires 360,000 multiplication operations and 359,400 addition operations for the 3GPP-LTE system, whereas transmitting samples extracted from partial responses of the channel in the (DCT) transform domain with $\Delta=8$ in accordance with the invention makes it possible to reduce the number of multiplication operations by 78 times and the number of addition operations by 37 times.

The table below thus gives the number of multiplication operations and of addition operations that are needed as a function of the number of frequency sample vectors $\Delta$ delivered by the sharing step, for the WiFi 802.11n standard or the 3GPP-LTE standard:

| $\Delta$ | Number of multiplication operations (802.11n/3GPP-LTE) | Number of addition operations (802.11n/3GPP-LTE) |
|---|---|---|
| 2 | 160/4608 | 414/12802 |
| 4 | 128/4096 | 316/11268 |
| 8 | 96/4608 | 224/9737 |

Figure 10A:
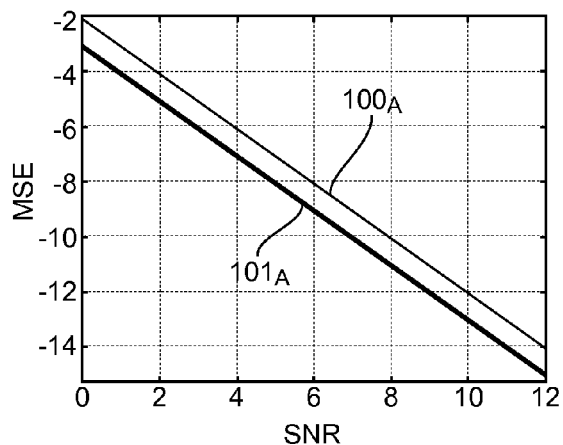
FIGS. 10A and 10B show the performance of the invention in the second implementation.
Figure 10B:
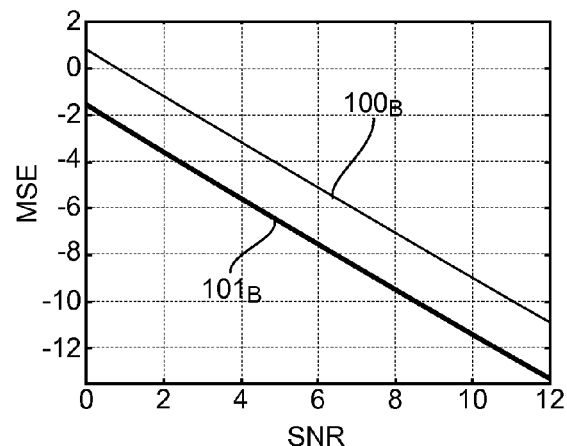

Finally, the performance of the invention is shown in FIGS. 10A and 10B that represent the mean square error (MSE) between the real channel and the channel response as generated at the transmitter after receiving the return signal, as a function of the signal-to-noise ratio in application of the 802.11n standard (FIG. 10A) and the 3GPP-LTE standard (FIG. 10B).

More precisely, the curve 100A (or 100B as the case may be) illustrates the mean square error as a function of the signal-to-noise ratio for feedback transmission of an overall response of the channel in a (DCT) transform domain, and the curve 101A (or 101B as the case may be) shows the mean square error as a function of the signal-to-noise ratio for feedback transmission of partial responses about the channel in a (DCT) transform domain, with $\Delta=2$. The curves for $\Delta=4$ or $\Delta=8$ are almost superposed on the curves obtained for $\Delta=2$.

5.7 An Example of a Transmission and Reception Link

Figure 11A:
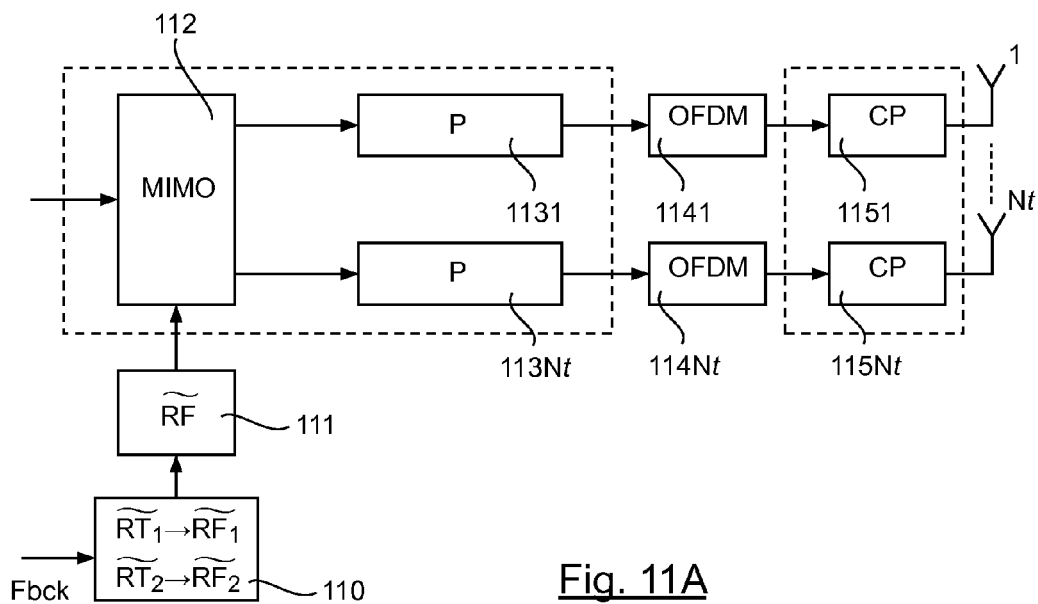
FIGS. 11A and 11B show an example of a transmission and reception link.
Figure 11B:
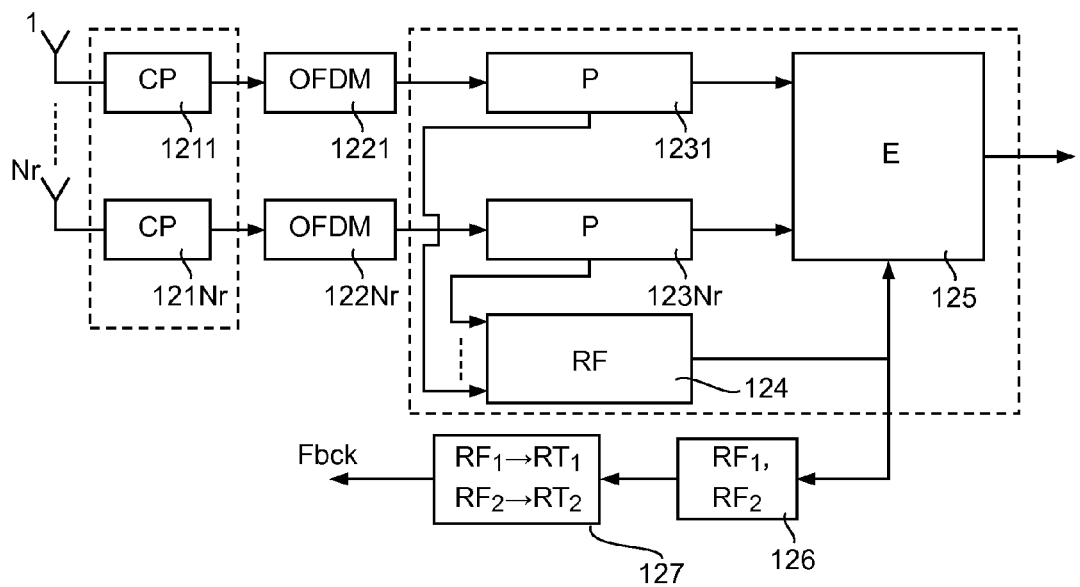

There follows a description with reference to FIGS. 11A and 11B of an example of a transmission and reception link in a MIMO transmission system implementing Nt transmit antennas and Nr receive antennas with OFDM modulation.

At the transmission end, the transmitter (e.g. an access point AP) receives a feedback signal Fbck transmitted using the above-described reception method, and conveying at least two sets that comprise samples representative of the channel in the transform domain, each associated with a distinct partial response.

These samples in the transform domain are then transformed into the frequency domain in a transform module 110 that delivers the frequency sample vectors ($\vec{RF1}$, $\vec{RF2}$). This operation makes it possible to recover the frequency response of the channel for the various carrier groups (various sub-bands).

The frequency sample vectors are then recombined in a recombination module 111, thereby making it possible to recover the frequency response of the channel over all of the non-null carriers, and delivering overall information about the channel in the frequency domain (channel estimate). The multicarrier signal is then shaped in conventional manner to take account of the channel estimate (MIMO space/time coding 112, inserting pilot symbols P 1131 to 113Nt, OFDM modulation 1141 to 114Nt, inserting the guard interval CP 1151 to 115Nt, transmitting over the Nt transmit antennas). It should be observed that the MIMO space/time coding operation and the operation of inserting pilot symbols P are performed in the frequency domain, whereas the operations of inserting a guard interval are performed in the time domain.

At the reception end, the receiver (e.g. a station) receives a multicarrier signal on the Nr receive antennas, and performs conventional operations of eliminating the guard interval CP 1211 to 121Nr, OFDM demodulation 1221 to 122Nr, extracting the pilots P 1231 to 123Nr, estimating the channel 124 with the help of the pilots, delivering information about the channel in the frequency domain (frequency response), equalization and detection 125, and delivering an estimate of the transmitted data. It should be observed that the operations of eliminating the guard interval are performed in the time domain and the operations of extracting pilots, of estimating the channel, and of equalization and detection, are performed in the frequency domain.

In addition to these operations, the receiver shares the frequency samples of the frequency response of the channel (channel estimate obtained in the frequency domain) among at least two frequency sample vectors in a sharing module 126. The receiver then transforms the frequency sample vectors from the frequency domain to a transform domain in a transform module 127 that, for at least one frequency sample vector, delivers a partial response to the channel in the transform domain.

A partial response has samples representative of the channel in the transform domain that are located in an interval presenting a length that is less than or equal to CP/$\Delta$ (for a transfer function of the Fourier transform type) or less than or equal to 2CP/$\Delta$ (for a transfer function of the cosine channel type), together with samples representative of noise in the transform domain.

The samples representative of the channel in the transform domain that are extracted from the partial responses are then coded and sent back over the return path (Fbck).

5.8 Structure of the Transmitters and Receivers

Figure 12A:
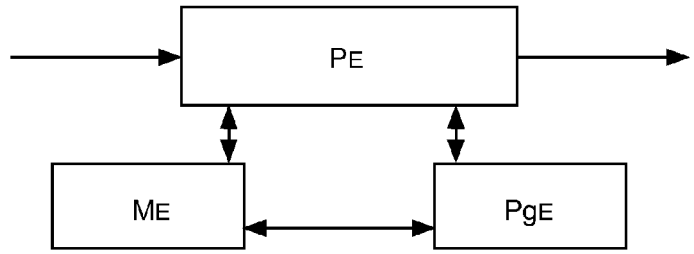
FIGS. 12A and 12B are block diagrams showing the structures of a transmitter and of a receiver in an embodiment of the invention.
Figure 12B:
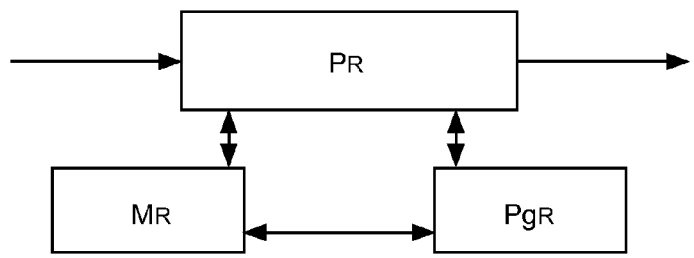

Finally, with reference to FIGS. 12A and 12B, simplified structures for a transmitter and for a receiver are described respectively for implementing a transmission technique and a reception technique in a particular implementation described above.

Such a transmitter has a memory ME including a buffer memory and a processor unit PE, e.g. fitted with a microprocessor and controlled by a computer program PgE, for performing the transmission method of the invention.

By way of example, on initialization, code instructions of the computer program PgE are loaded into a random access memory (RAM) prior to being executed by the processor of the processor unit PE. The processor unit PE receives as input, both data for sending and a return signal Fbck. The microprocessor of the processor unit PE performs the steps of the transmission method described above in application of the instructions of the computer program PgE in order to shape the multicarrier signal. For that purpose, the transmitter comprises not only the memory ME, but also means for receiving the return signal sent back by a receiver and delivering at least two sets comprising samples representative of the channel in the transform domain, means for transforming the sets to the frequency domain so as to deliver frequency sample vectors, and means for recombining the frequency sample vectors.

These means are controlled by the microprocessor of the processor unit PE.

Such a receiver comprises a memory MR including a buffer memory and a processor unit PR, e.g. having a microprocessor and controlled by the computer program PgR that implements the reception method of the invention.

By way of example, on initialization, the code instructions of the computer program PgR are loaded into a RAM prior to being executed by the processor of the processor unit PR. The processor unit PR receives the multicarrier signal as input. The microprocessor of the processor unit PR performs the steps of the above-described reception method in application of the instructions of the computer program PgR, in order to estimate the transmitted data and generate a return signal Fbck. For this purpose, in addition to the memory MR, the receiver includes means for estimating the transmission channel, means for sharing frequency samples of the channel over at least two frequency sample vectors, means for transforming the frequency sample vectors from the frequency domain to a transform domain, and sender means for sending back a return signal including at least samples representative of the channel in said transform domain as extracted from the partial responses.

These means are controlled by the microprocessor of the processor unit PR.

If optimized transfer functions are used, the memory MR also serves to store the eigenvalues obtained during the steps of decomposing the matrices into eigenvalues.

The invention claimed is:

1. A method comprising:

receiving with a receiver a signal corresponding to a multicarrier signal transmitted by a transmitter via at least one transmission channel, comprising:

an estimation step of the receiver estimating said at least one channel and delivering overall information about said at least one channel in the frequency domain, referred to as the "frequency response" and comprising frequency samples; and for said at least one channel:

at least one sharing step of subdividing the frequency response of said channel into blocks and delivering at least two frequency sample vectors, it being possible for a given frequency sample to belong to a plurality of frequency sample vectors;

a transform step of transforming said frequency sample vectors from the frequency domain to a transform domain and delivering, for at least one frequency sample vector, a partial response of said channel in said transform domain; and a feedback step of sending a return signal back to said transmitter, the return signal conveying samples extracted from said partial responses and representative of said channel in said transform domain.

2. The method according to claim 1, wherein said frequency response comprises N frequency samples, where N is the number of carriers of a pilot symbol of said multicarrier signal, and said sharing step shares in said frequency sample vectors only the Np frequency samples that correspond to the positions of the carriers of said pilot symbol that are modulated by pilots dedicated to estimating said channel, with Np less than N.

3. The method according to claim 1, wherein each frequency sample vector comprises $$\frac{N/\delta}{\Delta}$$

frequency samples, where N is the number of carriers of a pilot symbol of said multicarrier signal, $\delta$ is the ratio between the number Nmod of carriers modulated by a non-null value and the number Np of carriers modulated by pilots of said pilot symbol that are dedicated to estimating said channel, and $\Delta$ is the number of frequency sample vectors.

4. The method according to claim 1, wherein said transform step uses an inverse Fourier transform that delivers, for each frequency sample vector, a partial response of said channel in the time domain.

5. The method according to claim 1, wherein said transform step uses a cosine transform that delivers, for each frequency sample vector, a partial response of said channel in the transform domain.

6. The method according to claim 1, wherein said frequency response comprises N frequency samples, where N is the number of carriers of a pilot symbol of said multicarrier signal, and in that said sharing step shares said N frequency samples among $\Delta$ frequency sample vectors of size N/$\Delta$.

7. The method according to claim 6, wherein the method includes a step of the receiver processing said frequency sample vectors by associating each frequency sample vector with a modified vector comprising solely those frequency samples that correspond to the positions of carriers modulated by pilots of said pilot symbol that are dedicated to estimating said channel, and said transform step uses a transfer matrix for each modified vector, the matrix being constructed while taking account of the positions of the carriers that are modulated by pilots dedicated to estimating said channel.

8. The method according to claim 1, wherein the number of frequency sample vectors is a power of 2.

9. A return signal transmitted in accordance with the method of claim 1, the return signal comprising at least samples extracted from said partial responses and representative of said channel in said transform domain.

10. A receiver configured to receive a signal corresponding to a multicarrier signal transmitted by a transmitter via at least one transmission channel, said receiver comprising:

estimation means for estimating at least one channel and delivering overall information about said at least one channel in the frequency domain, referred to as the "frequency response" and comprising frequency samples;

sharing means for subdividing the frequency response of said channel into blocks and delivering at least two frequency sample vectors, it being possible for a given frequency sample to belong to a plurality of frequency sample vectors;

transform means for transforming said frequency sample vectors from the frequency domain to a transform domain and delivering, for at least one frequency sample vector, a partial response of said channel in said transform domain; and feedback means for sending a return signal back to said transmitter and conveying at least samples extracted from said partial responses and representative of said channel in said transform domain.

11. A method of transmitting a multicarrier signal via at least one transmission channel by a transmitter, the method comprising:
- receiving a return signal sent back from a receiver to the transmitter and delivering at least two sets comprising samples representative of said channel in the transform domain and each associated with a distinct partial response of said channel in the transform domain;
- transforming said sets to the frequency domain, thereby delivering frequency sample vectors; and
- recombining said frequency sample vectors, thereby delivering overall information about said channel in the frequency domain.

12. The method according to claim 11, wherein said transforming step performs the following steps, for at least one of said sets:
- constructing a sample vector in the transform domain and of size $N/\Delta$, the vector comprising said set and null elements, where N is the number of carriers of a pilot symbol and $\Delta$ is the number of frequency sample vectors; and
- multiplying said sample vector in the transform domain by a transfer matrix of size $N/\Delta \times N/\Delta$, thereby delivering a frequency sample vector of size $N/\Delta$.

13. The method according to claim 11, wherein for at least one of said sets, said transforming step performs a step of multiplying said set by a transfer matrix of size $CP/\Delta \times N/\Delta$ that is extracted from a matrix representative of a transform of size $N/\Delta \times N/\Delta$, thereby delivering a frequency sample vector of size $N/\Delta$, with N being the number of carriers of a pilot symbol, $\Delta$ being the number of frequency sample vectors, and CP being the number of samples in the guard interval of the multicarrier signal.

14. A transmitter configured to transmit a multicarrier signal via at least one transmission channel, the transmitter comprising:
- receiver means for receiving a return signal sent back by a receiver to the transmitter delivering at least two sets comprising samples representative of said channel in the transform domain, each set being associated with a distinct partial response of the channel in the transform domain;
- transform means for transforming said sets to the frequency domain and delivering frequency sample vectors; and
- recombination means for recombining said frequency sample vectors and delivering overall information about said channel in the frequency domain.

15. A non-transitory computer-readable medium comprising a computer program stored thereon and including instructions for performing a method of receiving by a receiver when the program is executed by a processor, wherein the method comprises:
- receiving with the receiver a signal corresponding to a multicarrier signal transmitted by a transmitter via at least one transmission channel, comprising:
- an estimation step of the receiver estimating said at least one channel and delivering overall information about said at least one channel in the frequency domain, referred to as the "frequency response" and comprising frequency samples; and
- for said at least one channel:
  - at least one sharing step of subdividing the frequency response of said channel into blocks and delivering at least two frequency sample vectors, it being possible for a given frequency sample to belong to a plurality of frequency sample vectors;
  - a transform step of transforming said frequency sample vectors from the frequency domain to a transform domain and delivering, for at least one frequency sample vector, a partial response of said channel in said transform domain; and
  - a feedback step of sending a return signal back to said transmitter, the return signal conveying samples extracted from said partial responses and representative of said channel in said transform domain.

* * * * *